United States Patent [19]

Martella et al.

[11] Patent Number: 5,082,470
[45] Date of Patent: Jan. 21, 1992

[54] ALKYL PHENOL-FORMALDEHYDE CONDENSATES AS FUEL ADDITIVES

[75] Inventors: David J. Martella, Princeton; John J. Jaruzelski, Westfield, both of N.J.

[73] Assignee: Exxon Chemical Patents Inc., Linden, N.J.

[21] Appl. No.: 630,062

[22] Filed: Dec. 19, 1990

Related U.S. Application Data

[62] Division of Ser. No. 107,507, Oct. 8, 1987.

[51] Int. Cl.$^5$ .................................................. C10C 1/18
[52] U.S. Cl. ........................................ 44/304; 44/440; 568/718; 568/720
[58] Field of Search .................. 44/304, 440; 568/718, 568/720

[56] References Cited

FOREIGN PATENT DOCUMENTS 2606105 12/1975 Fed. Rep. of Germany ..... 252/48.2

Primary Examiner—Jacqueline V. Howard
Attorney, Agent, or Firm—V. T. White

[57] ABSTRACT

Additives for improving the low temperature flow properties of hydrocarbon oils are disclosed, which comprise the condensation reaction product of alkylated phenol and aldehyde, wherein:

(a) the polymer composition has a number average molecular weight of at least about 3,000 and a molecular weight distribution of at least about 1.5;

(b) in the alkylated phenol reactant the alkyl groups (i) are essentially linear; (ii) have between 6 and 50 carbon atoms; and (iii) have an average number of carbon atoms between about 12 and 26; and (c) not more than about 10 mole % of the alkyl groups on the alkylated phenol have less than 12 carbon atoms and not more than about 10 mole % of the alkyl groups on the alkylated phenol have more than 26 carbon atoms. The additives may also be sulfurized, or produced in a branched backbone form in which monomer reactants are copolymerized with certain tri- or tetrafunctional comonomers. Blends of these additives with various hydrocarbon oils, and particularly various middle distillates and lubricating oil compositions, whose low temperature flow properties are significantly improved thereby, are also disclosed.

48 Claims, 4 Drawing Sheets

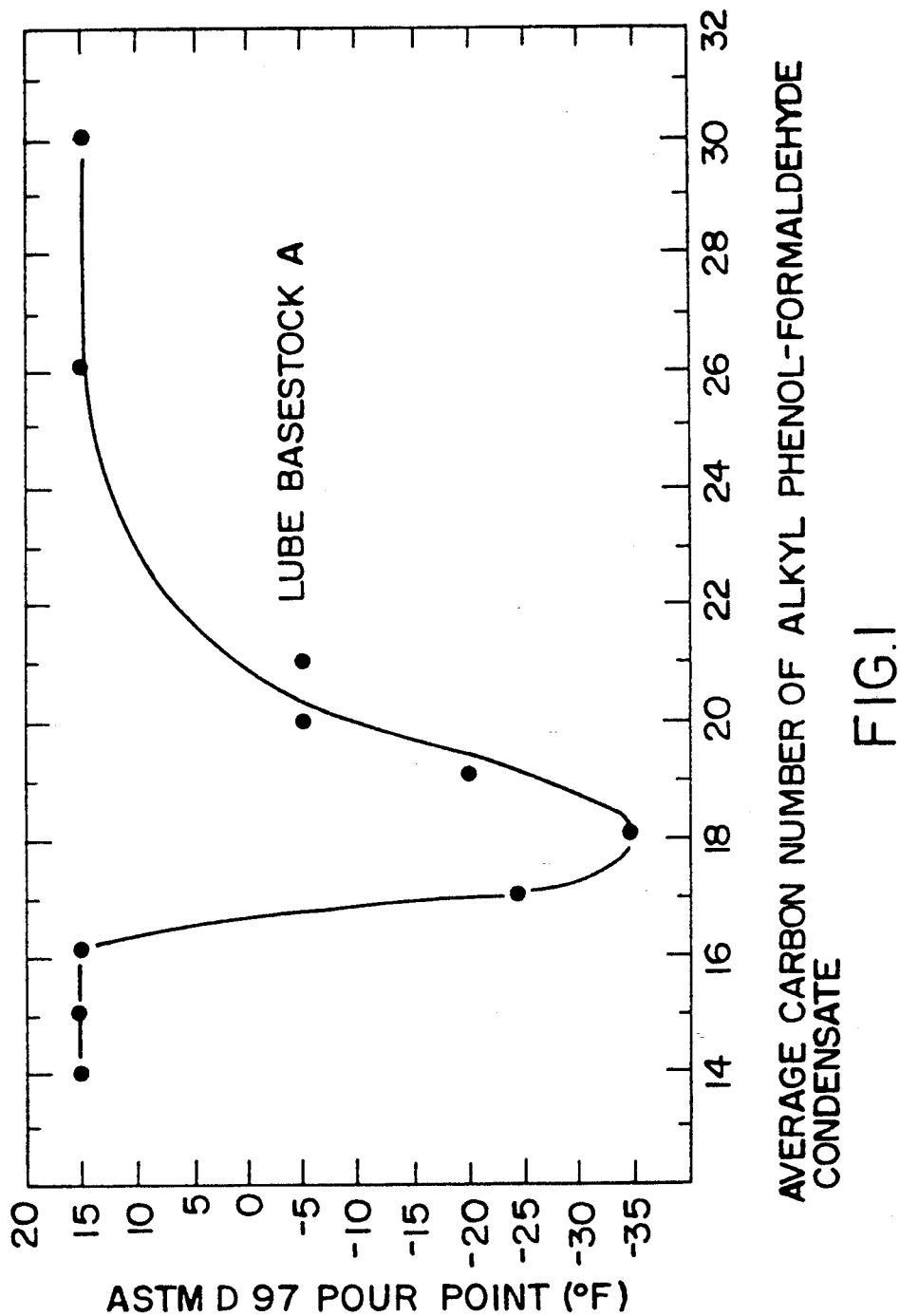

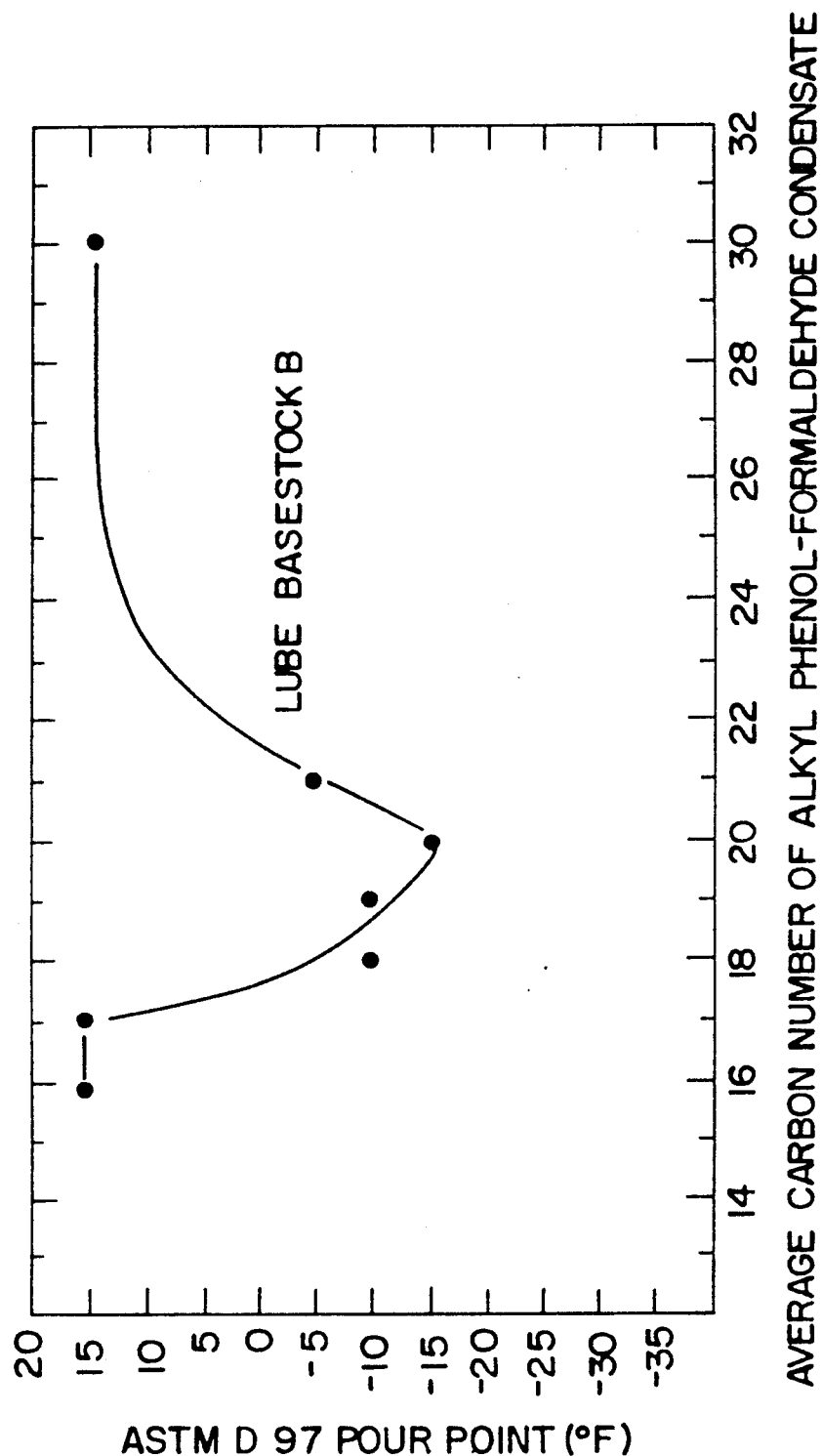

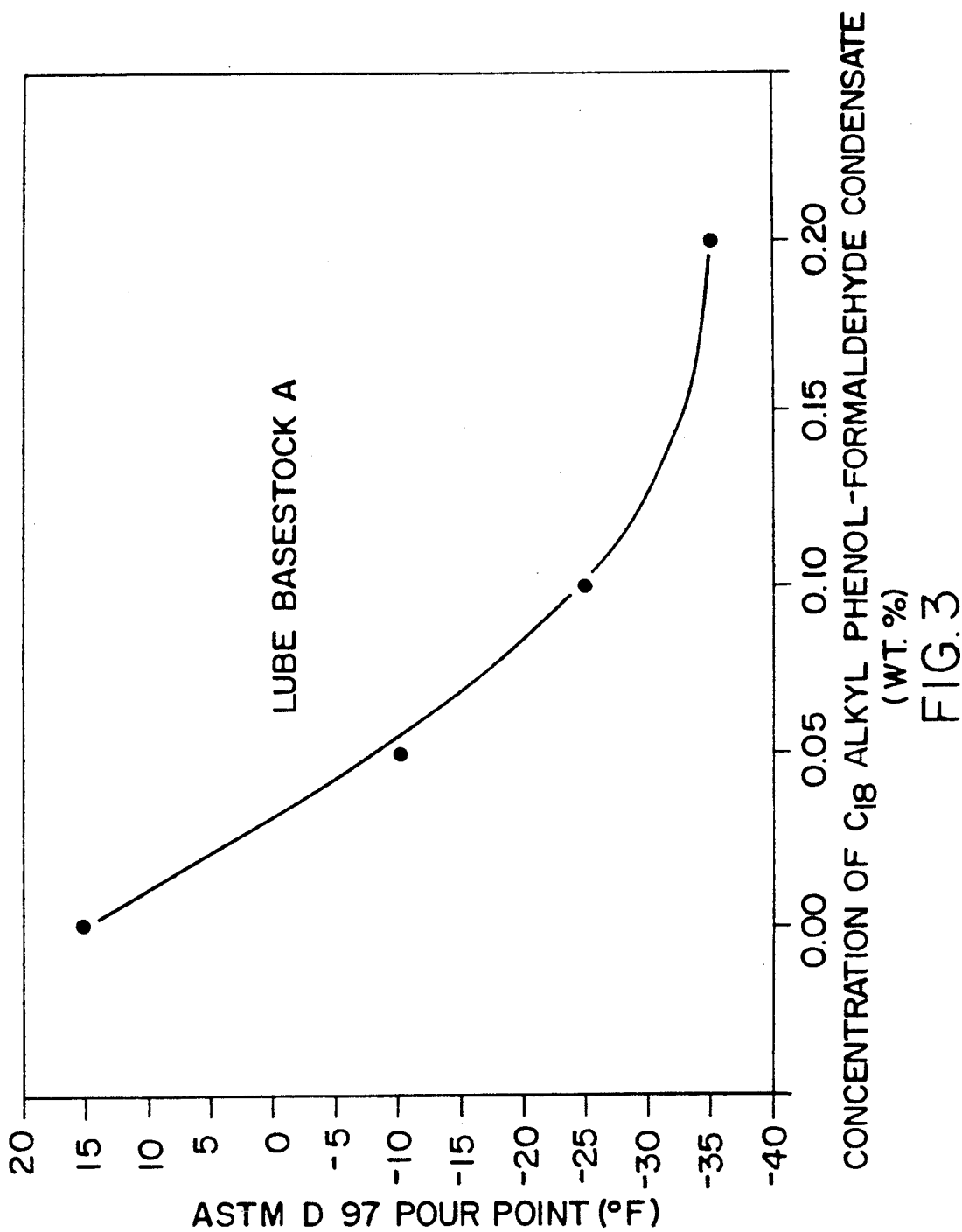

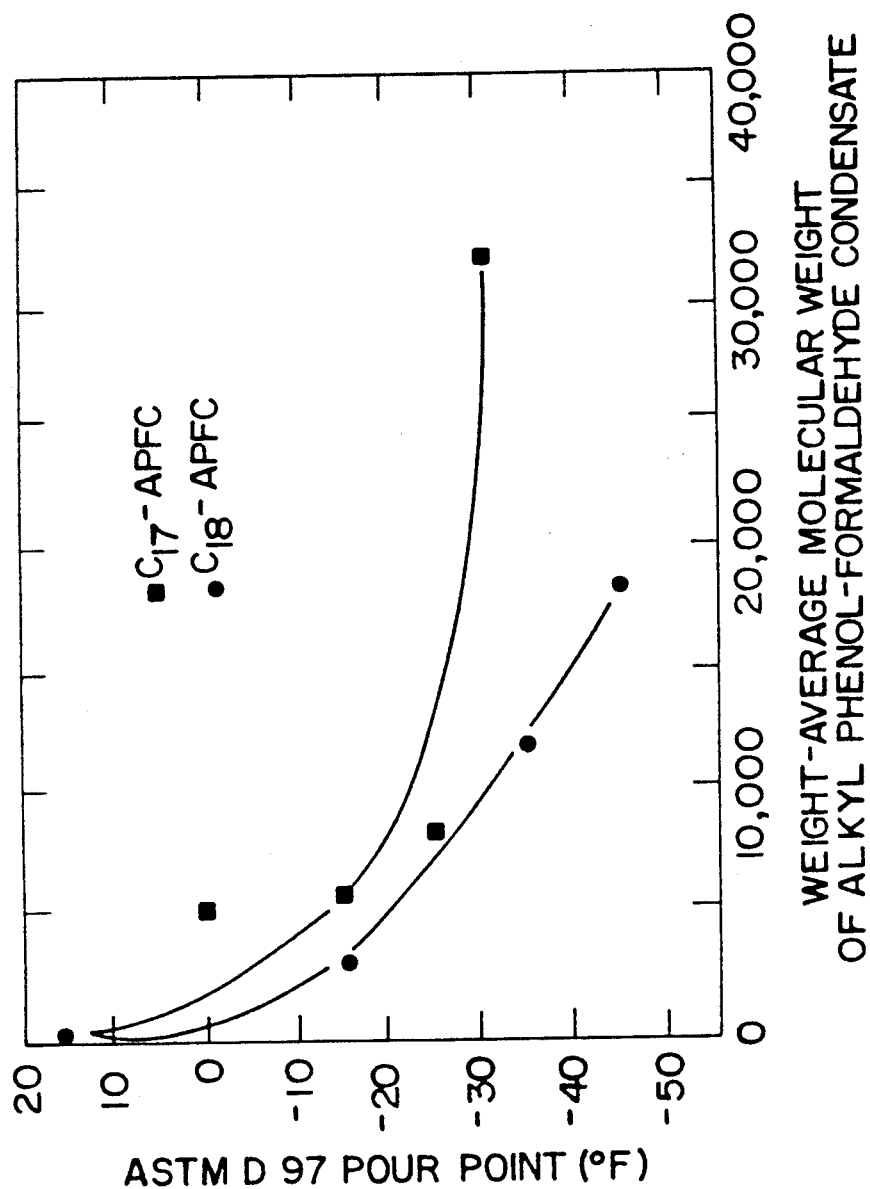

ALKYL PHENOL-FORMALDEHYDE CONDENSATES AS FUEL ADDITIVES

This is a division, of application Ser. No. 107,507, filed Oct. 8, 1987.

FIELD OF THE INVENTION

The present invention relates to additives for improving the low temperature flow properties of hydrocarbon oils. More particularly, the present invention relates to additives for improving the flow properties of fuel oil and lubricating oil compositions. Still more particularly, the present invention relates to fuel oil and lubricating oil compositions having improved low temperature flow properties. Still more particularly, the present invention relates to methods for producing additives for improving the flow properties of these various hydrocarbon oil compositions.

BACKGROUND OF THE INVENTION

A large variety of additives for improving various properties in hydrocarbon oil compositions are well known, and in fact a large number of these compositions are being used on a commercial level. The various additives are used for a variety of purposes, many of which relate to improving the low temperature (i.e., less than about 30° F.) flow properties of various types of hydrocarbon oils, including both lubricating oil fractions and other oil fractions including heating oils, diesel oils, middle distillates, and the like. In particular, these flow improvers generally modify the wax crystals in both lubricating oils and other hydrocarbon fractions and crudes so as to impart low temperature handling, pumpability, and/or vehicle operability thereto. These parameters are generally measured by a variety of tests, including pour point, cloud point, mini-rotary viscometry (MRV) and others. Other such additives are used primarily for imparting other properties to these hydrocarbon fractions, including lubricating oil fractions, such as anti-oxidant properties and the like.

Cloud point (ASTM D 2500) is the temperature at which wax crystals first appear as a haze in a hydrocarbon oil upon cooling. Such wax crystals typically have the highest molecular weight of the waxes in the hydrocarbon oil and therefore the lowest solubility. The cloud point of a hydrocarbon oil reflects the temperature at which problems in filtering the oil are encountered. However, the cloud point of a lubricating oil (as opposed to a fuel oil) is of less significance than is its pour point because the filters typically encountered by a lubricating oil (e.g., combustion engine oil filters) have a relatively large pore size, and filter plugging is therefore less of a problem in these environments.

Pour point is the lowest temperature at which a hydrocarbon oil will pour or flow when chilled, without disturbance, under specified conditions. Pour point problems arise through the formation of solid or semi-solid waxy particles in a hydrocarbon oil composition under chilled conditions. Thus, as the temperature of the oil is decreased, the distribution of such oil by pumping or siphoning is rendered difficult or impossible when the temperature of this oil is around or below the pour point of the oil. Consequently, when the flow of oil cannot be maintained, equipment can fail to operate.

It has therefore been necessary to develop various additives for the purpose of influencing the cold temperature flow properties of hydrocarbon oils.

The general term "lubricating oil flow improver" (LOFI) covers all those additives which modify the size, number, and growth of wax crystals in lube oils in such a way as to impart improved low temperature handling, pumpability, and/or vehicle operability as measured by such tests as pour point, cloud point, and mini rotary viscometry (MRV). The majority of lubricating oil flow improvers are polymers or contain polymers. These polymers are generally of two types, either backbone or sidechain.

The backbone variety, such as the ethylene-vinyl acetates (EVA), have various lengths of methylene segments randomly distributed in the backbone of the polymer, which associate or cocrystallize with the wax crystals inhibiting further crystal growth due to branches and non-crystallizable segments in the polymer.

The sidechain-type polymers, which are the predominant variety used as LOFI's, have methylene segments as the side chains, preferably as straight side chains. These polymers work similarly to the backbone type except the side chains have been found more effective in treating isoparaffins as well as n-paraffins found in lube oils. More specifically, LOFI's are typically derived from unsaturated carboxylic acids or anhydrides which are esterified to provide pendent ester groups derived from a mixture of alcohols. Most current commercial additives of this type thus require the use of relatively expensive alcohols for their production. Representative examples of this type of side chain LOFI include dialkyl fumarate/vinyl acetate copolymers and esterified styrene/maleic anhydride copolymers.

It would be extremely advantageous if additives could be developed which rely on less expensive olefins rather than alcohols in the synthesis of low temperature flow improvers without sacrificing the properties of conventional alcohol-based LOFI's Several commercially unsuccessful attempts have been made in the past using alkylated phenol formaldehyde condensates.

One additive composition which has been disclosed as a pour depressant for fuels and crude oils is set forth in British Patent No. 1,173,975. The additive disclosed in this patent is a phenol-aldehyde (preferably formaldehyde) polymer in which the phenol has an R - or RCO - substituent in which R is hydrocarbyl or substituted hydrocarbyl. R is further said to contain from 18 to 30 carbon atoms, and is preferably a straight chain alkyl group. The specific examples in this patent which use olefins to provide these R groups include various internal olefins, and there is no specific disclosure regarding the advantages of using terminal olefins therein. Another patent, British Patent No. 1,167,427, discloses the use of esters of such phenol-aldehyde polymers for pour point reduction of fuel oils. In both of these British patents, the oils to be treated are said to have a maximum viscosity of about 1500 cSt at 100° F., and neither recognizes the significance of utilizing specific alpha-olefins and mixtures thereof to produce these condensation products or the advantages of imparting essential linearity to the olefin-derived side chains Another additive composition which has been disclosed for use as a pour point depressant, so as to modify the surface of the wax contained within lubricating and fuel oil compositions by absorption or co-crystalization so as to reduce the fluid occlusion by these crystals, is a phenolic compound disclosed in U.S. Pat. No. 3,336,226. The compound shown in this patent is an alkyl phenol trimer having methylenic bridges which is mono-substituted by alkyl groups of between 14 and 25 carbon atoms. This patent specifically discloses trimeric compositions having number average molecular weights far lower than 3,000, in fact, lower than 1,500, and furthermore broadly discloses the use of olefins for alkylation of the phenol compositions prior to condensation with formaldehyde. The olefins disclosed in this patent are either terminal or internal olefins, and a trimer is prepared by conducting the condensation reaction in the presence of a metal hydroxide. Moreover, alkylation process conditions are not controlled to minimize rearrangement of even the terminal olefins.

Another lubricating oil composition is disclosed in U.S. Pat. No. 3,248,361. In this case cylinder lubricants are modified in order to reduce combustion chamber deposits by using an additive product of an olefin oxide with either a sulfur modified condensation product of a substituted monohydric phenol that includes a hydrocarbon substituent containing from 4 to 18 carbon atoms and an aliphatic aldehyde, or a partial salt of that sulfur-modified condensation product and an alkali metal, ammonia, or a Group II metal. This patent does not disclose a condensation product of an alkylated phenol and an aldehyde. U.S. Pat. No. 3,951,830 discloses lubricant additives particularly used as oxidation inhibitors comprising sulfur and methylene bridged polyphenol compositions. These are prepared by reacting phenol with formaldehyde followed by sulfurization or by sulfurizing phenols prior to reaction with formaldehyde. This patent also discloses phenols which are substituted with aliphatic or cycloaliphatic radicals of a wide range and variety, and it also discloses the use of poly-substituted materials, such as dialkyl and trialkyl phenols therein. All of the examples in this patent employ tetrapropene, polyisobutene, and other such substituted phenol compositions therein, and not essentially linear alkylated phenols of a specified length.

U.S. Pat. No. 4,446,039 discloses yet another additive for fuels and lubricants which, in this case, is prepared by reacting aromatic compounds, such as phenol or substituted phenol including alkyl groups of at least 50 carbon atoms, with an aldehyde, such as formaldehyde, and a non-amino hydrogen, active hydrogen compound, such as phenol, optionally along with an aliphatic alkylating agent of at least 30 carbon atoms. This patent also discloses that sulfurized additive compositions thereof can also be used as lubricant additives and fuel oil additives. It does not disclose the use of alpha-olefins of less than 50 carbon atoms for the alkylation of phenol.

Another additive for improving the various cold flow characteristics of hydrocarbon fuel compositions is disclosed in U.S. Pat. No. 4,564,460. In this patent the additives are broadly disclosed as including either an oil soluble ethylene backbone polymer or various hydrocarbyl-substituted phenols as a first component and various reaction products of hydrocarbyl-substituted carboxylic acylating agents and amines and/or alcohols. The hydrocarbyl-substituted phenol constituents of this overall additive are also broadly described, and they can include repeating aromatic moieties, such as those shown in column 14 thereof, in which the R* groups include hydrocarbyl groups of from 8 to 30 carbon atoms. These, in turn, can be provided by internal olefins or alpha-olefins, and can be either straight or branched. Notwithstanding the extremely broad disclosure of this patent, not a single working example is provided therein which makes or tests any hydrocarbyl substituted phenol or aldehyde condensation product thereof.

British Patent No. 2,062,672 discloses another such additive, in this case including a sulfurized alkyl phenol and a carboxylic dispersant. The alkyl phenols disclosed in this patent can include alkyl radicals of up to 1000 carbon atoms, but the disclosure also mentions the use of methylene-bridged alkyl phenols prepared by the reaction of the alkyl phenol and formaldehyde.

Finally, Canadian Patent No. 1,192,539 discloses yet another alkyl-phenol-containing lubricant additive. In this case the lubricant is designed for two-cycle engines and the phenolic compound includes a hydrocarbyl group of an average of at least ten aliphatic carbon atoms. Furthermore, the disclosure states that the aromatic ring can be a linked polynuclear aromatic moiety, which can also include other substituents. Once again in this case the disclosure is very broad, and includes innumerable variations on the alkyl phenol component.

Irrespective of all of the above, and the large number of additive compositions which have previously been proposed and utilized for altering the various flow properties of hydrocarbon oils and lubricating oil compositions, the search has continued for additional flow improving compositions which can not only significantly improve the flow characteristics of these various hydrocarbon compositions, but which also can be easily produced on an economical basis.

Commonly assigned U.S. patent application Ser. No. 107,457, filed on Oct. 8, 1987 by the inventors herein is directed to sulfur bridged alkyl phenol condensates, derived from the alkylated phenols described herein and used for the purposes described herein.

SUMMARY OF THE INVENTION

In one aspect of the present invention, there is provided a polymer composition capable of improving the low temperature flow properties of hydrocarbon oils comprising the condensation reaction product of reactants comprising alkylated phenol, comprising at least 80 mole % difunctional alkylated phenol and aldehyde wherein:

(a) the polymer composition has a number average molecular weight of at least about 3,000 and a molecular weight distribution of at least about 1.5;

(b) in the alkylated phenol reactant the alkyl groups (i) are essentially linear; (ii) have between 6 and 50 carbon atoms; and (iii) have an average number of carbon atoms between about 12 and 26; and (c) not more than about 10 mole % of the alkyl groups on the alkylated phenol have less than 12 carbon atoms and not more than about 10 mole % of the alkyl groups on the alkylated phenol have more than 26 carbon atoms.

In a preferred embodiment, the polymeric composition can be represented by the formula:

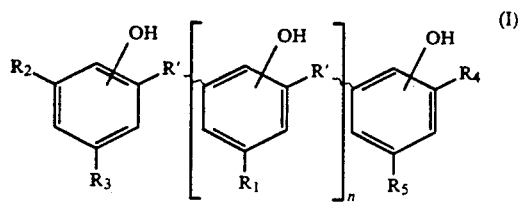

wherein (a) R' comprises $C_1$ to $C_{30}$ alkyl; (b) $R_1$ represents alkyl derived from linear alpha-olefins having from 6 to 50 carbon atoms; (c) $R_2$, $R_3$, $R_4$ and $R_5$ represent hydrogen or alkyl derived from linear alpha-olefins having from 6 to 50 carbon atoms, provided that at least one of $R_2$ and $R_3$ and at least one of $R_4$ and $R_5$ are alkyl; (d) in the alkyl groups constituting $R_1$ to $R_5$; (i) the average number of carbon atoms is between about 12 and 26; (ii) not more than about 10 mole % of said alkyl groups have less than 12 carbon atoms and not more than about 10 mole % of said alkyl groups have more than 26 carbon atoms; and (iii) the alkyl groups are essentially linear; (e) n is a number of at least about 5; and (f) the polymer has a number average molecular weight of at least about 4,500 and a molecular weight distribution of at least about 1.5. In a preferred embodiment, R' in formula (I) comprises $CH_2$.

In another aspect of the present invention the polymeric compositions are sulfurized, and preferably have a number average molecular weight of at least about 5,000.

In another aspect of the present invention growing linear backbones are crosslinked during formation with comonomer, which preferably can be either a trifunctional comonomer having the formula:

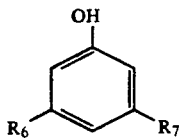

(II)

wherein $R_6$ and $R_7$ can be hydrogen, alkyl, aryl, alkoxy, aryloxy, alkyl mercapto, or halogen; or a tetrafunctional comonomer having the formula:

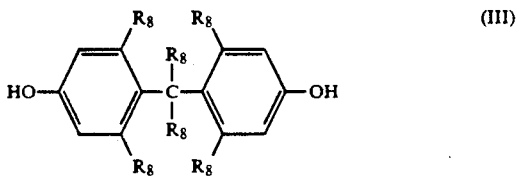

(III)

wherein $R_8$ can be hydrogen, alkyl, aryl, alkoxy, aryloxy, alkyl mercapto, or halogen. In a preferred embodiment, $R_6$ and $R_7$ in formula (II) and $R_8$ in formula (III) are hydrogen.

In accordance with another aspect of the present invention, polymeric additives are provided by reacting alkylated phenol represented by the formula:

(IV)

wherein R represents essentially linear alkyl having from 6 to 50 carbon atoms in which the average number of such carbon atoms in all of the alkyl groups is between about 16 and 22, wherein not more than about 10 mole % of the alkyl groups have less than 16 carbon atoms and not more than about 10 mole % of the alkyl groups have more than 22 carbon atoms, with formaldehyde, and optionally comonomer selected from formulas (II) and (III) above.

In accordance with another aspect of the present invention, a method for preparing these polymeric compositions is provided.

In accordance with a preferred method of the present invention, the condensation step is conducted in the presence of the trifunctional or tetrafunctional comonomer components discussed above.

In a still further aspect of the present invention, hydrocarbon oil compositions containing these polymeric additives are provided.

BRIEF DESCRIPTION OF THE FIGURES

The following detailed description can be more fully appreciated with reference to the attached Figures, in which:

FIG. 1 is a graphical representation plotting pour point versus average carbon number of the pendent alkyl groups of the alkyl phenol-formaldehyde condensates hereof;

FIG. 2 is another graphical representation plotting pour point versus average carbon number of the pendent alkyl groups for the alkylated phenol-formaldehyde condensates hereof, with a different oil blend;

FIG. 3 is a graphical representation plotting pour point versus additive concentration; and FIG. 4 is a graphical representation plotting pour point versus the weight average molecular weight for the alkylated phenol-formaldehyde concentrates hereof.

DETAILED DESCRIPTION OF THE INVENTION

The additives of the present invention comprise fuel oil and lubricating oil flow improvers which are effective for modification of the size, number, and growth of wax crystals in various hydrocarbon oils, including fuel oils and lubricating oils, so as to impart improved low temperature flow properties to these oils. Most particularly, when used in connection with lubricating oil compositions, these lubricating oil flow improvers are also effective to improve the low temperature handling, pumpability, and/or vehicle operability as measured by such tests as pour point and mini-rotary viscometry (MRV). When used in connection with fuels, such as middle distillate petroleum fuels, such as diesel fuels, heating oils and the like, these fuel oil flow improvers are also effective to improve the low temperature handling characteristics thereof, as most particularly measured by such tests as cloud point and pour point tests. Secondarily, these materials also possess anti-oxidant activity.

The additive compositions of the present invention are prepared by the alkylation of phenol with specified more readily available and less expensive alpha-olefins, or blends thereof, under conditions sufficient to impart essential linearity to the alkyl group of the alkylate, followed by condensation with an aldehyde such as formaldehyde so as to produce polymers having certain specified molecular weights. More particularly, the use of the specific linear alpha-olefins which are set forth below in the manner described results in superior lubricating oil and fuel oil flow improvers relative to other alkyl phenol-formaldehyde condensates employed in the prior art. As will be demonstrated, these particular polymers are particularly and unexpectedly superior in terms of their ability to co-crystalize with the wax crystals in these hydrocarbon oils. Furthermore, in accordance with other embodiments of the present invention condensate polymers are produced in a sulfurized and/or more highly branched form, for molecular weight enhancement, and to thus further improve the low temperature flow properties of these various hydrocarbon oils.

The particular alkyl phenol-aldehyde condensates which form the basic polymers of the present invention are generally produced by an initial alkylation step, followed by condensation with the aldehyde component.

Alkylation of the phenol is initially conducted with a linear alpha-olefin or blend of linear alpha-olefins which are terminal olefins, as contrasted to internal olefins. In this manner, it is possible to produce final polymers in which the alkyl group attached to the benzene ring is essentially linear. By "essentially linear" is meant greater than 35, preferably at least 40, and most preferably at least 50 mole % of the alkyl groups derived from the olefin alkylating agent and attached to the aromatic ring of the phenol group (exclusive of the alkyl groups of any tri- or tetrafunctional optional comonomers described hereinafter for molecular weight enhancement) in the alkylated product is linear, except for a methyl group pendant from the carbon attached to that aromatic ring. More specifically, since terminal alpha-olefins are employed for the alkylation of phenol in accordance herewith, the terminal olefins will attach to the aromatic ring at the beta carbon thereof, thereby leaving the alpha carbon as a methyl group pendant from the beta carbon of the original olefin. Thus, expressed differently, "essentially linear" means greater than 35 mole % of the alkyl groups of the alkylated phenol are alpha methyl substituted linear alkyl. The primary alkyl phenol product desired from this alkylation step (after rearrangement as discussed hereinafter) will be linear to at least that extent.

More specifically, the initial alkylation step itself is an exothermic reaction of phenol with these particular linear terminal alpha-olefins. This reaction can thus be shown as follows:

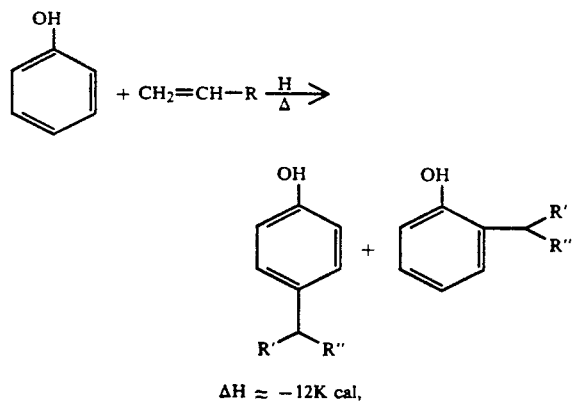

$\Delta H \simeq -12K\ cal,$ and in which reaction R is linear alkyl, and R' and R" are linear alkyl groups derived in whole or in part from R. This exothermic reaction is thus a simple cationic reaction resulting in a somewhat complex product. In the ideal reaction the olefin forms a carbonium ion species as a result of the presence of acidic conditions and temperatures. This cation can then readily react with phenol at either the ortho or para positions. Without rearrangement, the carbonium ion species will attach to the aromatic ring at the beta carbon of the olefin, and R' will thus constitute a pendant methyl group derived from the alpha carbon of the original olefin, with R" constituting the remainder of the linear alkyl chain originally defined by R. In reality, however, many side reactions are possible. Thus, the cation can revert back to the olefin or rearrange further down the linear chain, thereby producing attachment to the aromatic ring at a more internal carbon atom, and causing the length of R' to increase, and R" to decrease in length correspondingly. It has been found that if these rearrangements are too extensive, they will lead to the production of inferior products which would not suitably interact with the wax crystals of the lubricating oil or fuel oil to which they are eventually added.

It is therefore critical to the present invention to minimize these rearrangements and to maximize the attachment of the alkyl groups at the 2-position (i.e., beta carbon of the original linear olefin). It has thus been found that there are methods to minimize such rearrangement, and they primarily include carrying out the alkylation process at lower reaction temperatures as opposed to elevated reaction temperatures. More particularly, although the alkylation process itself can generally be conducted at temperatures of between about 50° and 200° C., it is most important to employ alkylation temperatures of at or below about 100° C., preferably at or below 90° C., e.g., typically between about 50° and 100° C., and preferably between about 50° and 90° C., to minimize rearrangement.

It has also been observed that rearrangement is more likely to occur at the para position than the ortho position. This is probably a result of a steric factor which permits greater accommodation of rearrangement at the para position to the hydroxyl group.

Accordingly, the definition of "essentially linear" accounts for, and expresses the permissible limits of, the above-discussed autogenous rearrangement in forming the alkylate product. In short, "essentially linear" expresses the maximum degree of acceptable branching in the alkylate product which can be tolerated when starting with linear alpha-olefins. The degree of rearrangement is typically determined by $^1$H-NMR and/or by high pressure liquid chromatography.

Another critical aspect of the present invention is the carbon number and carbon number distribution of olefins employed for alkylation.

The particular linear alpha-olefins used in connection with the alkylation step of the present invention are, as indicated above, crucial to the manufacture of the proper additives for use herein. In particular, these linear alpha-olefins have the formula $CH_2=CH-R$, in which R is straight chain alkyl having between about 4 and about 48 carbon atoms, and in which the specific alpha-olefin or mixture of alpha-olefins used for this alkylation has an average carbon number (on a molar basis for mixtures of olefins) of between about 12 and 26 (e.g. 14 and 24), preferably between about 16 and 22 (e.g., 17 and 21, or 16 and 19), and most preferably between about 18 and 20.

Moreover, the olefin mixture should not contain more than about 10 mole %, preferably not more than about 5 mole %, and most preferably not more than about 2 mole % of alpha-olefins having independently: (a) less than about 12, preferably not less than about 14, and most preferably not less than about 16 carbon atoms; and (b) not more than about 26, preferably not more than about 24, and most preferably not more than about 22 carbon atoms. These proportional requirements are thereby incorporated into, and embodied in, the final condensate polymer.

The particular average carbon number range which is most desirable will depend upon the ultimate environment of the alkyl phenol condensate which is produced hereby. That is, as is specifically shown in the data presented below, when used in connection with fuel oil formulations, additives in accordance with the present invention will preferably utilize a slightly lower average carbon number for these R groups.

More particularly, it has thus been found that in connection with such fuel oils, including diesel fuels and heating oils, to maximize cloud point reduction an average carbon number of about $C_{18}$ is most desired, while to maximize pour point reduction an average carbon number of about $C_{16}$ is most desired.

On the other hand, in connection with lubricating oil compositions the average carbon number for maximizing pour point reduction is an average carbon content of from about $C_{18}$ to $C_{20}$.

Moreover, within each class of hydrocarbon oils, i.e., fuel or lubricating oil, each specific hydrocarbon oil can be associated with an optimum average carbon number for the R group (also referred to herein as the alkylate average carbon number) to achieve maximum cloud point or pour point depressancy relative to the base oil without any additive. Optimum pour depressancy will typically be achieved by an average carbon number that is lower than that needed to achieve optimum cloud point depressancy for a given hydrocarbon oil.

It has been further found that while the molecular weight and molecular weight distribution ($M_w/M_n$) of the condensate polymer, degree of branching, and concentration of the condensation polymer in the hydrocarbon oil all affect, and are important for achieving low temperature flow performance, the two most dominant factors are the optimum alkylate average carbon number and the essential linearity of the alkyl group.

It has also been found that in any given situation the use of a range of alpha-olefins surrounding the optimum average carbon number is superior to the use of a single alpha-olefin having that number of carbon atoms. In any event, the most preferred alpha-olefins for use herein will thus include 1-hexadecene, 1-octadecene, 1-eicosene, 1-docosene, 1-tetracosene, and mixtures thereof.

A further important factor in conducting the alkylation reaction is the minimization of monofunctional alkylation product (e.g., most dialkylate products) and the maximization, relative to monofunctional alkylate, of difunctional alkylate products (e.g., mono alkylates) in the phenol alkylation reaction. As discussed hereinafter, the final alkyl phenol aldehyde condensation product is synthesized to possess certain minimum requirements in terms of molecular weight and molecular weight distribution. If the alkylated phenol product mixture employed for condensation contains too much monofunctional dialkylate, then the final condensation polymer will not meet such requirements. This stems from the fact that when a second alkyl group attaches to the phenol to yield a 2,4- or a 2,6- dialkyl phenol, it results in a monofunctional dialkylate molecule which, if reacted with a growing polymer chain, would terminate chain growth in the following manner:

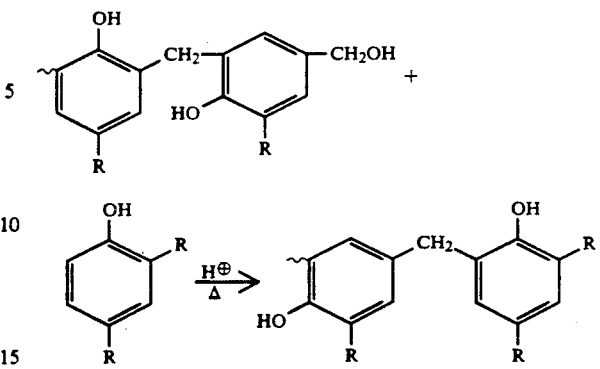

More specifically, the functionality of the alkylated-phenol reaction product expresses the number of available reactable sites, which remain on the alkylated phenol after alkylation, that can participate in the polymerization reaction through propagation of a growing polymer chain. The only freely reactable sites on an unsubstituted phenol molecule for purposes of polymerization are the 2-, 4-, and 6- carbons of the phenol aromatic ring. Thus, unsubstituted phenol is a trifunctional molecule. If monoalkylation occurs at only one of the 2-, 4-, or 6- positions, the resulting mono-alkylate is said to be difunctional, since one of the reactable sites has been eliminated through substitution of an alkyl group thereon. Similarly, the substitution of alkyl groups at any two of the 2-, 4-, or 6- carbons of the phenol molecule through dialkylation will result in the formation of a monofunctional dialkylate product. Thus, 2,4-dialkyl phenol and 2,6-dialkyl phenol are monofunctional dialkylates which will lead to chain termination, and thereby limit polymer molecular weights. While 2,5-dialkyl phenol and 3,5-dialkyl phenol are difunctional and trifunctional dialkylate monomers, respectively, such monomers do not normally form under typical alkylation conditions, because such formation would involve reaction at normally unreactive sites. Consequently, one seeks to minimize dialkylation generally, as most dialkylation leads to the formation of monofunctional monomer. Thus, reference to dialkylation herein as being undesirable is technically a reference only to dialkylation which yields monofunctional dialkylate.

An equation relating the maximum degree of polymerization (DP) to the extent of reaction ($p$) and the functionality (f) of the reactants is referred to as the Modified Carothers Equation:

$$DP=2/(2-pf)$$

This equation can be used to show that a monofunctional dialkylate monomer severely limits the maximum degree of polymerization in the alkyl phenol-aldehyde condensation reaction.

As will be discussed hereinafter, the use of separately synthesized tri- and tetrafunctional comonomers can be employed to increase the molecular weight of the final condensation polymer and/or to compensate for the presence of monofunctional dialkylate monomer.

Thus, the target molecular weights described hereinafter can be suitably achieved by controlling the amount of difunctional (e.g., monoalkylate) monomer to be typically at least about 80 mole %, and preferably at least about 85 mole %, and most preferably at least about 90 mole %, and typically from about 80 to about 100 mole %, preferably from about 85 to 100 mole %, and most preferably from about 90 to 100 (e.g., 95 to 100) mole %, based on the total moles of alkylate monomer in the monomer mixture intended for polymerization.

Correspondingly, the amount of monofunctional dialkylate monomer which can be tolerated will typically range from about 0 to about 20 mole %, preferably from about 0 to about 15 mole %, and most preferably from about 0 to about 10 (e.g. 0 to about 5) mole % based on the moles of monomer in the alkylate monomer mixture.

High functionality monomers, such as the tri- and tetrafunctional comonomers described hereinafter, are typically employed in collective amounts of from about 0 to about 10 mole %, preferably from about 2 to about 8 mole %, and most preferably from about 3 to about 5 mole %, based on the total moles of alkylate monomer in the alkylate monomer mixture.

One way to minimize dialkylation in attempting to meet the condensation polymer molecular weight targets specified hereinafter is to employ excess phenol relative to the olefin for the alkylation reaction. Accordingly, effective molar ratios of phenol to olefin can vary typically from about 2:1 to about 10:1 (or higher), preferably from about 2:1 to about 5:1. From a process standpoint, however, too much of an excess of phenol can be disadvantageous because of the need to remove the excess phenol from alkylation product after alkylation is completed.

Thus, it has been found that certain zeolite catalysts as described hereinafter permit one to lower the phenol:olefin molar ratio to less than about 2:1, preferably between about 1.7:1 and 1:1 and still achieve minimization of dialkylation. This low ratio extremely simplifies unreacted phenol recovery.

The alkylation reaction can generally be accomplished, within the above parameters, by a number of techniques which are well known to those skilled in this art. One particularly suitable technique is by using the Friedel-Crafts reaction which occurs in the presence of a Lewis acid catalyst, such as boron trifluoride and its complexes with ethers, phenols, hydrogen fluoride, etc., aluminum chloride, aluminum bromide, and zinc dichloride, etc. Methods and conditions for carrying out such reactions are well known to those skilled in this art, and reference is made, for example, to the discussion in the article entitled "Alkylation of Phenols," in *Kirk-Othmer Encyclopedia of Chemical Technology*, 2nd Edition, Vol. 1, pp. 894–895, Interscience Publishers, Division of John Wiley and Company, New York, 1963, which is incorporated herein by reference thereto. A particularly preferred catalyst for use in such alkylation reactions is designated Amberlyst 15 by the Rohm and Haas Company. This catalyst is included among the strongly acidic macroreticular resins patented under U.S. Pat. No. 4,224,415. This resin is itself composed of long chains of polystyrene locked together by divinylbenzene crosslinks into a three-dimensional, insoluble polymeric phase called a matrix, on which are attached sulfonic acid groups ($-SO_3H$). Amberlyst 15 possesses high acidity (4.7 meq/g), high porosity (32%) and high surface area (45 $m^2/g$).

In a highly preferred method for carrying out the alkylation reaction hereof a zeolite catalyst is employed for use in the selective production of the desired monoalkylate. More particularly, acidic crystalline zeolites are used which have high silica to alumina ratios and which have effective pore sizes of between about 6 and 8 Angstroms, and include a number of commercial zeolite catalysts, such a LZ-Y82 catalyst manufactured by Union Carbide Corporation. In any event, a general description of these zeolites is set forth in Young, U.S. Pat. No. 4,283,573, which is incorporated herein by reference thereto. In general, these zeolites have a crystal structure which provides access to and egress from the intracrystalline free space of the zeolites by virtue of having channels or networks of pores, the openings of which again preferably have a major dimension, or a free pore diameter, of between about 6 Å and about 8 Å. These zeolites are also characterized by pore apertures of about a size as would be provided by 12-member rings of silicon and aluminum atoms. The preferred types of zeolites for use in this invention possess a silica to alumina molar ratio of from about 3:1 to about 6:1. This ratio represents, as closely as possible, the ratio in the rigid anionic framework of the zeolite crystal. Furthermore, these preferred zeolites will have a high surface area, such as about 625 $m^2/g$. The use of these zeolite catalysts thus permits one to eliminate the expensive and difficult distillation step required to separate the mono-alkylate from the di-alkylate produced with the acid-type catalysts previously utilized.

In connection with the alkylated phenol product, the use of a linear alpha-olefin or a mixture of linear alpha-olefins gives a ratio of ortho to para attachments on the phenol of about 2:1. In contrast with the alkylated phenol product of this reaction, the use of a branched internal olefin or a mixture of branched internal olefins gives a ratio of ortho to para attachments on phenol of about 1:18. However, essentially linear alkyl groups attached either ortho or para to the hydroxy group perform equally well.

The next step in the preparation of the polymer additives of the present invention is the actual polymerization or condensation reaction. The reaction itself is a condensation of the above-described alkyl phenol in the presence of aldehyde or the functional equivalent thereof. The function of the aldehyde is to bridge and link the alkyl phenol monomer. In particular, aliphatic ketones and aldehydes can be used herein to perform the bridging function and include those represented by the formula $R-C(O)R'$, where $R$ and $R'$ are hydrogen or an alkyl group having at least 1 carbon atom, and generally between 1 and 30 carbon atoms. Most preferably $R'$ will be hydrogen, i.e., in the case of the aldehydes, and from a practical standpoint, these aldehydes (or the corresponding ketones) will generally range from 1 to about 20 carbon atoms, and preferably from 1 to about 10 (e.g., 1 to 7) carbon atoms, with formaldehyde being highly preferred. Other aldehydes which can be used herein but which are less preferred than formaldehyde are acetaldehyde, 2-ethylhexanal, and propionaldehyde. In addition, aromatic aldehydes, such as benzaldehyde, may also be utilized. The term formaldehyde as used in connection with this invention includes reactive equivalents of formaldehyde under reaction conditions, a reversible polymer thereof such as paraformaldehyde, trioxane, or the like, and can thus be produced from the decomposition of paraformaldehyde, etc.

The condensation reaction with the alkylated phenol composition is generally carried out at temperatures in the range of from about 50° C. to about 150° C., preferably in the range of from about 75° C. to about 125° C. Temperatures below about 50° C. are undesirable as the rate of reaction is unduly slow, while temperatures above about 250° C. can be used, but will normally result in degradation of the materials. The reaction is generally carried out in the presence of an acidic or basic material. The preferred acid catalysts which may be employed include hydrochloric acid, phosphoric acid, acetic acid, oxalic acid, and strong organic acids, such as p-toluenesulfonic acid, etc. While the relative proportions of the ingredients used are not critical, it is generally desirable to use a mole ratio of alkyl phenol to aldehyde in the range of from about 2:1 to about 1:4, and preferably of about 1:1. While the amount of acid or basic catalyst used in the formaldehyde-alkyl phenol condensation reaction is also not critical, it is usually convenient to use about 1 to 5 wt. %, based on the amount of formaldehyde used in the reaction.

The reaction between the alkylated phenol and the formaldehyde may be carried out in the absence of a diluent, but it is often convenient to use a suitable diluent, typically a substantially inert organic diluent such as mineral oil or an alcohol, ether, ether alcohol or the like, such as diluents including benzene, toluene, xylenes, paraffins, and the like. Diluents may be advantageous in aiding the maintenance of reaction temperatures and in the removal of water of reaction therefrom.

Furthermore, pressure is also not a critical factor, and can be atmospherical or below up to 1000 psi or higher. Atmospheric pressure is preferred for convenience, and the pressure should be sufficient to maintain the reactants in the liquid phase.

The reactants, together with the catalyst and any diluent which is employed, can thus be charged to a reactor and reacted under the conditions set forth above. Water of reaction, together with any water that may have been introduced with the initial charge, is removed during the course of the reaction to drive the condensation to completion. This can most conveniently be done by overhead distillation, although other techniques known in the art can also be employed. The condensation is essentially complete when no further water of reaction is eliminated. The crude reaction product mixture can then be cooled, neutralized, water-washed to remove the catalyst, dried, and then stripped to remove excess reactant, any unreacted materials, and any diluent that may have been used.

The condensation reaction is conducted in a manner and under conditions sufficient to achieve or surpass certain minimum number average and weight average molecular weight targets. Accordingly, the condensation reaction is conducted to impart to the final polymer a number average molecular weight ($M_n$) as determined by vapor-phase osmometry of at least about 3,000 (e.g., at least about 4,000), preferably at least about 5,000, and most preferably at least about 7,000, and typically from about 3,000 to about 60,000 (e.g., 4,000 to 60,000), preferably from about 5,000 to about 30,000, most preferably from about 7,000 to about 20,000, and a weight average molecular weight ($M_w$) as determined by gel permeation chromatography, of at least about 4,500 (e.g., at least about 5,000), preferably at least about 6,000, and typically from about 4,500 to about 100,000, preferably from about 10,000 to about 70,000 (e.g., 6,000 to about 35,000), and most preferably from about 20,000 to about 50,000.

The maximum number and weight average molecular weights are limited only by the solubility of the condensate polymer in the particular hydrocarbon basestock in question.

It is most preferred that these polymers have a ratio of weight average molecular weight to number average molecular weight ($M_w/M_n$), commonly referred to as molecular weight distribution, of greater than about 1.5, preferably greater than about 2.0, and most preferably greater than about 2.5, and typically from about 1.5 to about 34, preferably from about 2.0 to about 24, and most preferably from about 3.0 to about 7.0. Generally, the higher the weight average molecular weight, the better suited or more effective these polymers are for improving the flow properties of various hydrocarbon oils in accordance with the present invention.

While number average molecular weight ($M_n$) can conveniently also be determined by gel permeation chromatography (GPC), it is considered that VPO techniques are more accurate, although the $M_n$ by the GPC technique will typically approximate $M_n$ by VPO within ±1000, more typically +500.

In one embodiment, polymers or condensates which are thus produced in accordance with this process can be represented by the following formula:

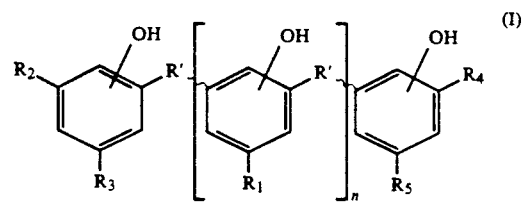

in which R' is an alkyl group derived from the ketone or aldehyde reactant having from 1 to 30 carbon atoms, and preferably having from 1 to 20 carbon atoms, $R_1$ represents attached essentially linear alkyl groups discussed above derived from the linear alpha-olefin having from about 6 to 50 carbon atoms, in which the average number of carbon atoms in all of the groups constituting $R_1$ is between about 12 and 26, preferably between about 16 and 22, and most preferably between about 18 and 20, and in which no more than about 10 mole % of alkyl groups have less than 12 carbon atoms and no more than about 10 mole % of alkyl groups have more than 26 carbon atoms; $R_2$, $R_3$, $R_4$ and $R_5$ independently can represent hydrogen or alkyl as described in connection with $R_1$, with the proviso that at least one of $R_2$ and $R_3$ is said alkyl and at least one of $R_3$ and $R_4$ is said alkyl. The hydroxy group of the phenol will be located on an aromatic carbon which is adjacent to a carbon on which at least one of the R' groups is attached.

The value of n is subject to the number average molecular weight targets discussed above, and the minimum value thereof expressed hereinafter will consequently vary depending on the average carbon number of the olefins employed for alkylation and the number of repeating units controlled by n necessary to achieve such $M_n$ values when accounting for said olefin average carbon number.

Accordingly, n is a number which, subject to the above constraints, will typically be at least 5 (e.g., at least 8), preferably at least 10 (e.g., at least 12), and most preferably at least 15, and can vary typically from about 5 to about 80, preferably from about 10 to about 60, and most preferably from about 15 to about 30.

As indicated above, it can be somewhat difficult to increase the molecular weights of the alkylated phenol-aldehyde condensates beyond a certain level because of the propensity of dialkylate monomers to terminate chain growth.

One such way to further increase molecular weight is to form a sulfurized alkylated phenol-aldehyde condensate polymer. Such sulfurization can be carried out by employing a sulfurizing agent, such as elemental sulfur or a sulfur halide such as sulfur monochloride, or preferably sulfur dichloride. The sulfurization reaction itself is typically effected by heating the alkylated phenol-aldehyde reaction product with the sulfurizing agent at temperatures of between about 50° and 250 ° C., and preferably of at least about 160° C. if elemental sulfur is used, and optionally in the presence of a suitable diluent such as those recited above. This is carried out for a period of time sufficient to effect substantial reaction with the sulfurizing agent. It is generally preferable to incorporate between about 5 and 10 wt. % of sulfur into the alkylated phenol-aldehyde product. Particularly in those cases where a sulfur halide is used as the sulfurizing agent, it is frequently preferred to use an acid acceptor such as sodium hydroxide, sodium acetate or the like to react with the hydrogen halide evolved therein. The precise molecular structure of the product formed by sulfurization is believed to be a sulfur and alkylene (e.g., methylene) bridged polyphenol composition. By doing so, the number average molecular weight of these compositions can be increased to greater than about 6,000, and the weight average molecular weight, as determined by gel permeation chromatography, to greater than about 8,000, and preferably between about 10,000 and 100,000 (once again as limited by the solubility of these compositions in the particular basestocks involved). Furthermore, incorporation of sulfur provides anti-oxidant properties for these additives. A less preferred alternative method for achieving sulfurization is to incorporate the sulfurizing agent into the condensation reaction mixture.

There are yet additional and/or alternative methods of increasing the molecular weight of the alkylated phenol-aldehyde condensate flow improvers of the present invention. In one such method, the polymerization step is carried out in the additional presence of trifunctional or tetrafunctional comonomer (functionality being reactable sites) so as to produce an ultimate condensation polymer having a branched backbone rather than linear backbone as shown in formula (I) hereabove, wherein said linear backbones are crosslinked through these tri- and tetrafunctional monomers.

In particular, a trifunctional comonomer having the following formula can be employed:

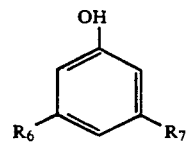

in which $R_6$ and $R_7$ can be hydrogen, alkyl, aryl, alkoxy, aryloxy, alkyl mercapto, and halogen. More particularly, it is preferred that $R_6$ and $R_7$ include branched or straight chain alkyl groups, preferably straight chain, such as $C_1$ through $C_{30}$ alkyl, preferably methyl, $C_6$ through $C_{14}$ aryl, $C_1$ through $C_{22}$ alkoxy, $C_6$ through $C_{14}$ aryloxy, $C_1$ through $C_{30}$ alkyl mercapto, and preferably halogens such as chlorine and bromine.

As discussed above, 3,5-dialkylate is difficult to achieve under normal alkylation conditions. Consequently, a variety of methods well known in the art can be employed to achieve 3,5-dialkylation. One such method involves a thallation reaction wherein, for example, 1,3-dimethyl benzene is contacted with a thallium trifluoro acetate catalyst to cause stereo specific oxidation to 3,5-dimethyl phenol.

Representative examples of trifunctional monomers include phenol, m-cresol, 3,5-xylenol, m-phenyl phenol, m-methoxyphenol, orcinol, and m-methyl mercapto phenol, while phenol is preferred.

For example, when phenol is employed as the trifunctional monomer, then a portion of the branched backbone can be represented by the following formula with an asterisk indicating the original phenol trifunctional monomer:

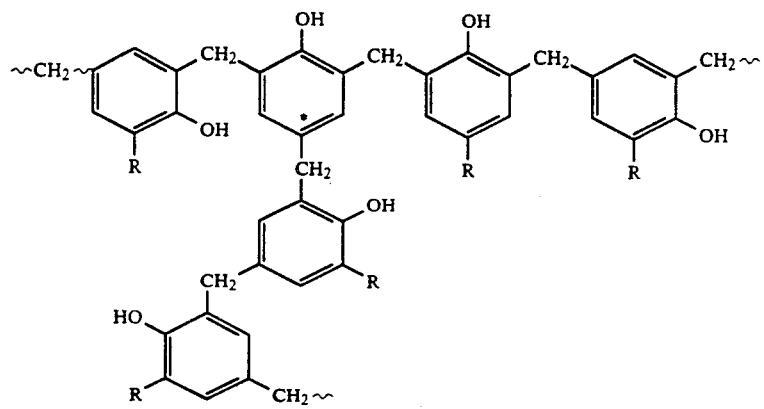

It is thus possible in this manner to produce such polymer condensates having weight average molecular weights determined by gel permeation chromatography of greater than about 10,000, preferably between about 10,000 and 100,000, and most preferably greater than about 20,000.

Even further branching is achieved with tetrafunctional monomer, which can crosslink four linear backbones.

The tetrafunctional comonomers which can be used in the polymerization step of the present invention can have the formula:

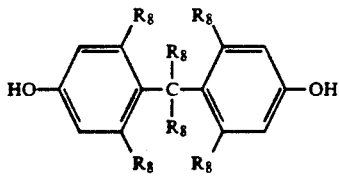

(III)

in which $R_8$ independently can be the same hydrogen, alkyl, aryl, alkoxy, aryloxy, alkyl mercapto, and halogen components discussed above in connection with the trifunctional comonomers as formula II hereof. Representative examples of suitable tetrafunctional comonomers include bisphenol A, bisphenol B, methylene-4,4'-bis (3,5-dibutyl phenol), methylene-4,4'-bis (3,5-dimethoxy phenol), and methylene-4,4'-bis (3,5-dimethyl mercapto phenol), with bisphenol A being preferred. Again, in this case it is also possible to produce such polymer condensates having weight average molecular weights determined by gel permeation chromatography of greater than about 10,000, preferably between about 10,000 and 100,000 and most preferably greater than about 20,000.

The amount of such trifunctional and/or tetrafunctional comonomer employed in the polymerization or condensation step of the present invention must, however, be limited to a certain extent. That is, the amount of comonomer present should be less than about 10 wt. % of a combination of the alkylated phenol and the aldehyde, and preferably less than about 8 wt. %. It has thus been found that if too great an amount of the trifunctional and/or tetrafunctional comonomer is present, that material tends to crosslink to the extent that an insoluble mass can be formed thereby. This can be avoided, however, by using the amounts discussed above, and additionally by conducting the polymerization in the presence of small amounts of the trifunctional or tetrafunctional comonomer. Also, this comonomer can be continuously added during the course of polymerization, thereby becoming diluted with the polymerizing alkyl phenol composition to maintain the comonomer as dilute as possible throughout the polymerization reaction.

It is also contemplated, although less preferred, that blends of separately synthesized alkyl phenol condensates meeting the aforedescribed requirements can be employed.

For purpose of discussion, when such blends are employed, the overall alkylate average carbon number for each polymer component in the blend in which the alkylate portion thereof is derived from a single alpha-olefin, or single mixture of alpha-olefins, can also be referred to herein as the alkylate intra-molecular carbon average. However, the alkylate intra-molecular carbon average of each polymer component in the blend can then also be averaged on a molar basis to determine what is referred to herein as the alkylate inter-molecular carbon average for the blend.

It has been found that when the optimum alkylate average carbon number (i.e., intra-molecular average carbon number) has been determined for a particular hydrocarbon oil, the best low temperature performance is achieved by a single polymer which possesses this optimum average carbon number value, rather than a blend of polymers wherein each polymer component in the blend possesses a non-optimum alkylate intra-molecular carbon average, but the blend collectively possesses an alkylate inter-molecular carbon average value equal to the value of the optimum intra-molecular carbon average.

The polymer additives produced in accordance with the present invention have been found to be useful in fuel oils and lubricating oils. The normally liquid fuel oils are generally derived from petroleum sources, e.g., normally liquid petroleum distillate fuels, though they may include those produced synthetically by the Fischer-Tropsch and related processes, the processing of organic waste material or the processing of coal, lignite or shale rock. Such fuel compositions have varying boiling ranges, viscosities, cloud and pour points, etc., according to their end use as is well known to those of skill in the art. Among such fuels are those commonly known as diesel fuels, distillate fuels, heating oils, residual fuels, bunker fuels, etc., which are collectively referred to herein as fuel oils. The properties of such fuels are well known to skilled artisans as illustrated, for example, by ASTM Specification D #396-73, available from the American Society for Testing Materials. 1916 Race Street, Philadelphia, Pa. 19103.

Particularly preferred fuel oils include middle distillates boiling from about 120° to 725° F. (e.g., 375° to 725° F.), including kerosene, diesel fuels, home heating fuel oil, jet fuels, etc., and most preferably whose 20% and 90% distillation points differ by less than 212° F., and/or whose 90% to final boiling point range is between about 20° and 50° F. and/or whose final boiling point is in the range of 600° to 700° F.

The additives of this invention find their primary utility, however, in lubricating oil compositions, which employ a base oil in which the additives are dissolved or dispersed. Such base oils may be natural or a mixture of natural and synthetic oils.

Thus, base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into mixtures of natural and synthetic base oils provided these mixtures include at least about 80 wt. % of natural base oil. Suitable synthetic base oils for use in these mixtures include alkyl esters of dicarboxylic acids, polyglycols and alcohols; polyalpha-olefins, polybutenes, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends of oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cSt. at 100° C.

Thus, the additives of the present invention can be employed in a hydrocarbon oil (i.e., fuel oil or lubricating oil) composition which comprises hydrocarbon oil, typically in a major amount, and the additive, typically in a minor amount, which is effective to impart or enhance one or more of the low temperature flow properties described herein. Additional conventional additives selected to meet the particular requirements of a selected type of hydrocarbon oil composition can be included as desired.

The additives of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the additives, for instance, are soluble or stably dispersible in oil to an extent sufficient to exert their intended effect in the environment in which the oil is employed. Moreover, the additional incorporation of other additives may also permit incorporation of higher levels of a particular polymer adduct hereof, if desired.

Accordingly, while any effective amount of these additives can be incorporated into the fully formulated hydrocarbon oil composition, it is contemplated that such effective amount be sufficient to provide said hydrocarbon oil composition with an amount of the additive of typically from 0.005 to 10, e.g., 0.01 to 2, and preferably from 0.025 to 0.25 wt. %, based on the weight of said composition.

The additives of the present invention can be incorporated into the hydrocarbon oil in any convenient way. Thus, they can be added directly to the oil by dispersing, or dissolving the same in the oil at the desired level of concentration, typically with the aid of a suitable solvent such as toluene, cyclohexane, or tetrahydrofuran. Such blending can occur at room temperature or elevated temperatures. In this form the additive per se is thus being utilized as a 100% active ingredient form which can be added to the oil or fuel formulation by the purchaser. Alternatively, these additives may be blended with a suitable oil-soluble solvent and/or base oil to form a concentrate, which may then be blended with a hydrocarbon oil base stock to obtain the final formulation. Concentrates will typically contain from about 1 to 50%, by weight of the additive, and preferably from about 10 to 30% by weight of the additive.

The hydrocarbon oil base stock for the additives of the present invention typically is adapted to perform a selected function by the incorporation of additives therein to form lubricating oil compositions (i.e., formulations).

Representative additives typically present in such formulations include viscosity modifiers, corrosion inhibitors, oxidation inhibitors, friction modifiers, dispersants, anti-foaming agents, anti-wear agents, pour point depressants, detergents, rust inhibitors and the like.

Viscosity modifiers, or viscosity index (V.I.) improvers impart high and low temperature operability to the lubricating oil and permit it to remain shear stable at elevated temperatures and also exhibit acceptable viscosity or fluidity at low temperatures. These viscosity index improvers are generally high molecular weight hydrocarbon polymers including polyesters. The V.I. improvers may also be derivatized to include other properties or functions, such as the addition of dispersancy properties.

These oil soluble V.I. polymers will generally have number average molecular weights of from about 40,000 to 1,000,000, preferably from about 40,000 to about 300,000, as determined by gel permeation chromatography or membrane osmometry.

Examples of suitable hydrocarbon polymers include homopolymers and interpolymers of two or more monomers of $C_2$ to $C_{30}$, e.g., $C_2$ to $C_8$ olefins, including both alpha-olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and interpolymers of $C_6$ and higher alpha-olefins, atactic polypropylene, hydrogenated polymers and copolymers and terpolymers of styrene, e.g., with isoprene and/or butadiene.

More specifically, other hydrocarbon polymers suitable as viscosity index improvers include those which may be described as hydrogenated or partially hydrogenated homopolymers, and random, tapered, star, or block interpolymers (including terpolymers, tetrapolymers, etc.) of conjugated dienes and/or monovinyl aromatic compounds with, optionally, alpha-olefins or lower alkenes, e.g., $C_3$ to $C_{18}$ alpha-olefins or lower alkenes. The conjugated dienes include isoprene, butadiene, 2,3-dimethylbutadiene, piperylene and/or mixtures thereof, such as isoprene and butadiene. The monovinyl aromatic compounds include any of the following, or mixtures thereof, vinyl di- or polyaromatic compounds, e.g., vinyl naphthalene, but are preferably monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropyl-styrene, butylstyrene, isobutylstyrene, tert-butylstyrene (e.g., p-tert-butylstyrene). Also included are vinylxylenes, methylethyl styrenes and ethylvinylstyrenes. Alpha-olefins and lower alkenes optionally included in these random, tapered and block copolymers preferably include ethylene, propylene, butene, ethylene-propylene copolymers, isobutylene, and polymers and copolymers thereof. As is also known in the art, these random, tapered and block copolymers may include relatively small amounts, that is less than about 5 moles, of other copolymerizable monomers such as vinyl pyridines, vinyl lactams, methacrylates, vinyl chloride, vinylidene chloride, vinyl acetate, vinyl stearate, and the like.

Specific examples include random polymers of butadiene and/or isoprene and polymers of isoprene and/or butadiene and styrene. Typical block copolymers include polystyrene-polyisoprene, polystyrene-polybutadiene, polystyrene-polyethylene, polystyrene-ethylene propylene copolymer, polyvinyl cyclohexane-hydrogenated polyisoprene, and polyvinyl cyclohexane-hydrogenated polybutadiene. Tapered polymers include those of the foregoing monomers prepared by methods known in the art. Star-shaped polymers typically comprise a nucleus and polymeric arms linked to said nucleus, the arms being comprised of homopolymer or interpolymer of said conjugated diene and/or monovinyl aromatic monomers. Typically, at least about 80% of the aliphatic unsaturation and about 20% of the aromatic unsaturation of the star-shaped polymer is reduced by hydrogenation.

Representative examples of patents which disclose such hydrogenated polymers or interpolymers include U.S. Pat. Nos. 3,312,621; 3,318,813; 3,630,905; 3,668,125; 3,763,044; 3,795,615; 3,835,053; 3,838,049; 3,965,019; 4,358,565; and 4,557,849, the disclosures of which are herein incorporated by reference.

The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g., an alkylene polyamine or hydroxy amine, e.g., see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489; and 4,149,984.

Suitable hydrocarbon polymers are ethylene interpolymers containing from 15 to 90 wt. % ethylene, preferably 30 to 80 wt. % of ethylene and 10 to 85 wt. %, preferably 20 to 70 wt. % of one or more $C_3$ to $C_8$, alpha-olefins. While not essential, such interpolymers preferably have a degree of crystallinity of less than 10 wt %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc. include 1-butene, 1-pentene, 1-hexene, 1-heptene, 1-octene, etc.; also branched chain alpha-olefins, such as 4-methyl-1-pentene, 4-methyl-1-hexene, 5-methyl-1-pentene, 4,4-dimethyl-1-pentene, and 6-methyl-1-heptene, etc., and mixtures thereof.

Terpolymers, tetrapolymers, etc., of ethylene, said $C_{3-8}$ alpha-olefin, and a non-conjugated diolefin or mixtures of such diolefins may also be used. The amount of the non-conjugated diolefin generally ranges from about 0.5 to 20 mole %, preferably from about 1 to about 7 mole %, based on the total amount of ethylene and alpha-olefin present.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66° to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oil-soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR'NCSS)_nCu$ (where n is 1 or 2 and R and R' are the same or different hydrocarbyl radicals containing from to 18, and preferably 2 to 12, carbon atoms, and including radicals such as alkyl, alkenyl, aryl, arylalkyl, alkaryl and cycloaliphatic radicals. Particularly preferred as R and R' groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compounds are copper $Cu^I$ and/or $Cu^{II}$ salts of alkenyl succinic acids or anhydrides. The salts themselves may be basic, neutral or acidic. They may be formed by reacting (a) polyalkylene succinimides (having polymer groups of $M_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1,400, and up to 2,500, with a $M_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters, amides, and tertiary amines, e.g., hydroxy amines; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N-(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides; and succinate esters, or metal salts thereof, of hydrocarbyl substituted succinic acids or anhydrides and thiobisalkanols such as described in U.S. Pat. No. 4,344,853. The disclosures of the above references are herein incorporated by reference.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typical of those additives which usefully optimize the low temperature fluidity of the fluid are $C_8-C_{18}$ dialkylfumarate-vinyl acetate copolymers, polymethacrylates, and wax naphthalene.

Foam control can be provided by an antifoamant of the polysiloxane type, e.g., silicone oil and polydimethyl siloxane.

Anti-wear agents, as their name implies, reduce wear of metal parts. Representatives of conventional anti-wear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil-soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 754,001, filed July 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
|---|---|---|
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.005–10 | .01–2 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the flow improver (in concentrate amounts hereinabove described), together with one or more of said other additives (said concentrate when constituting an additive mixture being referred to herein as an additive-package) whereby several additives can be added simultaneously to the base oil to form the hydrocarbon oil composition. Dissolution of the additive concentrate into the hydrocarbon oil may be facilitated by solvents and by mixing accompanied with mild heating, but this is not essential. The concentrate or additive-package will typically be formulated to contain the flow improver additive and optional additional additives in proper amounts to provide the desired concentration in the final formulation when the additive-package is combined with a predetermined amount of base hydrocarbon oil. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil. For safety considerations, the base oil for concentrates is typically a lubricating oil rather than a fuel oil.

The final formulations may employ typically about 10 wt. % of the additive-package with the remainder being base oil.

All of said weight percents expressed herein are based on active ingredient (a.i.) content of the additive, and-/or upon the total weight of any additive-package, or formulation which will be the sum of the a.i. weight of each additive plus the weight of total oil or diluent.

This invention will be further understood by reference to the following examples, wherein all parts are parts by weight and all molecular weights are either number average molecular weight determined by vapor-phase osmometry or weight average molecular weights determined by gel permeation chromatography as noted unless otherwise specified, and which include preferred embodiments of the invention.

The following examples are given as specific illustrations of the claimed invention. It should be understood, however, that the invention is not limited to the specific details set forth in the examples. All parts and percentages in the examples, as well as in the remainder of the specification, are by weight unless otherwise specified.

EXAMPLE 1

As an example of the preparation of a typical alkylated phenol component used to produce the polymer condensates of the present invention, octadecylphenol was prepared by charging into a four-necked, 5 liter, round bottom flask equipped with a mechanical stirrer, 933 grams of phenol (9.93 moles) and 286 grams of Amberlyst-15 catalyst The flask was also equipped with a reflux condenser, a thermometer, an addition funnel, and a nitrogen inlet. This mixture was then heated to 70° C. under a blanket of nitrogen, and, with stirring, 834 grams (3.31 moles) of 1-octadecene were added dropwise over a period of about one hour. The reaction mixture was then heated to 90° C., and this temperature was maintained for a period of four hours, yielding greater than 98% conversion of olefin as measured by gas chromatography. The reaction mixture was then cooled to 50° C. and filtered to remove the catalyst. The excess phenol was removed by vacuum distillation, and the yield was 1,008 grams (or 88%). The product had a refractive index of 1.4859 at 25° C., a viscosity of 38.0 cP at 40° C., and a hydroxyl number of 144 mg KOH/gm. The infrared spectrum of the product showed absorption bands at 830 and 750 cm$^{-1}$, which are characteristic of alkyl phenols. The aromatic substitution pattern was determined by $^{13}$C-NMR and showed that the ortho to para ratio was 2:1. The alkyl substitution pattern was determined by $^1$H-NMR, and showed that the product consisted of 50 mole % 2-substituted alkylate and 50 mole % ≧3-substituted alkylate. The melting point and heat of fusion of the product was determined by differential scanning calorimetry (DSC) to be 8.7° C. and 85 J/g, respectively.

COMPARATIVE EXAMPLE 1

In order to demonstrate the criticality of the linearity of the alkyl group used in the alkyl phenol-aldehyde condensates of the present invention, Example 1 was repeated, except that in this case the mixture was heated to 115° C. instead of 90° C. The yield of octadecylphenol was 893 grams (or 78%). The product had a hydroxyl number of 138 mg KOH/g, and its infrared spectrum showed absorption bands at 830 and 750 cm$^{-1}$, which are characteristic of alkyl phenols. The aromatic substitution pattern was determined by $^{13}$C-NMR, and showed that the ortho to para ratio was 2:1. The alkyl substitution pattern was determined by $^1$H-NMR, and showed that the product consisted of 35 mole % 2-substituted alkylate and 65 mole % ≧3-substituted alkylate. The product's greater isomerization of the alkyl group was due to the higher reaction temperature, and is reflected in its thermal properties. The melting point and heat of fusion were determined by DSC to be −2.0° C. and 20 J/g, respectively.

EXAMPLE 2

As another example of the preparation of the alkylated phenols used in accordance with the present invention, Example 1 was repeated, except that a molar equivalent of 1-tetradecene ($C_{14}$) was substituted for the 1-octadecene ($C_{18}$) used in that example. The yield of tetradecylphenol was 749 grams (or 78%). The product had a refractive index of 1.4895 at 25° C., a viscosity of 31.8 cP at 40° C., and a hydroxyl number of 164 mg KOH/g. The infrared spectrum of the product showed absorption bands at 830 and 750 cm$^{-1}$. The aromatic substitution pattern, determined by $^{13}$C-NMR, showed an ortho to para ratio of 2:1. The melting point and heat of fusion were determined by DSC to be −34.9° C. and 24 J/g, respectively.

EXAMPLE 3

As another example of the preparation of the alkylated phenols used in accordance with the present invention, Example 1 was again repeated, except that in this case a molar equivalent of 1-pentadecene was substituted for the 1-octadecene. The yield of pentadecylphenol was 664 grams (or 66%). The infrared spectrum of the product showed absorption bands at 830 and 750 cm$^{-1}$. The melting point and heat fusion were determined by DSC to be −18.1° C. and 60 J/g, respectively.

EXAMPLE 4

As another example of the preparation of the alkylated phenol used in accordance with the present invention, Example 1 was again repeated, except that in this case a molar equivalent of 1-hexadecene was substituted for the 1-octadecene. The yield of hexadecylphenol was 958 grams (or 91%). The product had a refractive index of 1.4881 at 25° C., a viscosity of 34.6 cP at 40° C., and a hydroxyl number of 159 mg KOH/g. The infrared spectrum showed absorption bands at 830 and 750 cm$^{-1}$. The ortho to para ratio determined by $^{13}$C-NMR was 2:1. The alkyl substitution pattern determined by $^1$H-NMR showed that the product consisted of 50 mole % 2-substituted alkylate and 50 mole % ≧3-substituted alkylate. The melting point and heat of fusion were determined by DSC to be −9.9° C. and 56 J/g, respectively.

EXAMPLE 5

As another example of the preparation of the alkylated phenols used in accordance with the present invention, Example 1 was again repeated, except that in this case a molar equivalent of 1-heptadecene was substituted for the 1-octadecene. The yield of heptadecylphenol was 692 grams (or 63%). The product had a hydroxyl number of 162 mg KOH/g. The infrared spectrum showed absorption bands at 830 and 750 cm$^{-1}$, and the melting point and heat of fusion were determined by DSC to be 1.9° C. and 83 J/g, respectively.

EXAMPLE 6

As another example of the preparation of the alkylated phenols used in accordance with the present invention, Example 1 was again repeated, except that in this case a molar equivalent of 1-nonadecene was substituted for the 1-octadecene. The yield of nonodecylphenol was 989 grams (or 83%). The infrared spectrum of the product showed absorption bands at 830 and 750 cm$^{-1}$, and the melting point and heat of fusion were determined by DSC to be 17.5° C. and 92 J/g, respectively.

EXAMPLE 7

As another example of the preparation of the alkylated phenols used in accordance with the present invention, Example 1 was again repeated, except that in this case a molar equivalent of 1-eicosene was substituted for the 1-octadecene. The yield of eicosylphenol was 1,126 grams (or 91%). The product had a refractive index of 1.4877 at 25° C., a viscosity of 75.0 cP at 40° C., and a hydroxyl number of 139 mg KOH/g. The infrared spectrum showed absorption bands at 830 and 750 cm$^{-1}$. The ortho to para ratio as determined by $^{13}$C-NMR was 2:1. The alkyl substitution pattern determined by $^1$H-NMR showed that the product consisted of 49 mole % 2-substituted alkylate and 51 mole % $\geq$ 3-substituted alkylate. The product's melting point and heat of fusion were determined by DSC to be 23.4° C. and 101 J/g.

EXAMPLE 8

In this example, a preferred alkylated phenol in accordance with the present invention was prepared from a mixture of alpha-olefins. Thus, in this case, into a similar four-necked, 5 liter, round bottom flask, equipped with a mechanical stirrer, a reflux condenser, a thermometer, a jacketed addition funnel, and a nitrogen inlet, were added 933 grams of phenol (9.93 moles) and 286 grams of Amberlyst-15 catalyst. Nine hundred seventy-three grams of a mixture of 50 mole % 1-eicosene (C$_{20}$), 42 mole % 1-dococene (C$_{22}$), and 8 mole % 1-tetracosene (C$_{24}$) (molar average being C$_{21}$ H$_{42}$ [heneicosene]) were then charged to an addition funnel that was heated to prevent the olefin mixture from solidifying. While stirring, the heated olefin mixture was added dropwise over a period of one hour. The reaction mixture was then heated to 90° C., and this temperature was maintained for about five hours, giving greater than 97% conversion of olefin as measured by gas chromatography. The reaction mixture was cooled to 50° C. and filtered to remove the catalyst, and the excess phenol was subsequently removed by vacuum distillation. The yield was 1130 grams (or 88%). The product had a refractive index of 1.4810 at 25° C. and a hydroxyl number of 122 mg KOH/g, with the infrared spectrum, again showing bands at 830 and 750 cm$^{-1}$. The ortho to para ratio determined by $^{13}$C-NMR was 2:1. The alkyl substitution pattern determined by $^1$H-NMR showed that the product consisted of 50 mole % 2-substituted and 50 mole % $\geq$ 3-substituted alkylate. The product's melting point and heat of fusion were determined by DSC to be 28.2° C. and 110 J/g, respectively.

EXAMPLE 9

As another example of the preparation of an alkylated phenol using a mixture of alpha-olefins in accordance with the present invention, Example 8 was repeated, except that in this case a molar equivalent of a mixture of 30 mole % 1-tetracosene (C$_{24}$), 40 mole % 1-hexacosene (C$_{26}$), 20 mole % 1-octacosene (C$_{28}$), and 10 mole % 1-triacontene (C$_{30}$) (molar average being C$_{26}$ H$_{52}$) was substituted for the olefins used in Example 8. The yield was 1,425 grams (or 94%), and the product had a hydroxyl number of 103 mg KOH/g, with its infrared spectrum again showing absorption bands at 830 and 750 cm$^{-1}$. The product's melting point and heat of fusion were determined by DSC to be 48.7° C. and 64 J/g, respectively.

EXAMPLE 10

As another example of the preparation of an alkylated phenol using a mixture of alpha-olefins in accordance with the present invention, Example 8 was repeated, except that in this case a molar equivalent of a mixture of 20% 1-octacosene and 80% 1-triacontene (molar average C$_{30}$H$_{60}$) was substituted for the olefins used in Example 8. The yield in this case was 1,412 grams (or 83%), and the product had a hydroxyl number of 66 mg KOH/g, with its infrared spectrum again showing absorption bands at 830 and 750 cm$^{-1}$. The product's melting point and heat of fusion were determined by DSC to be 68.7° C. and 134 J/g, respectively.

EXAMPLE 11

As an example of the preparation of an alkylated phenol-formaldehyde condensate polymers of the present invention, into a four-necked, 1 liter round bottom flask, equipped with a mechanical stirrer, a thermometer, addition funnel, nitrogen inlet tube, and a Dean-Stark Trap with a reflux condenser, were charged 409 grams of octadecyl phenol produced in accordance with Example 1, and 38 grams of toluene, together with 0.5 grams of p-toluenesulfonic acid monohydrate. The mixture was then stirred under a nitrogen blanket and heated to reflux conditions. During refluxing, 32 grams of trioxane in 70 grams of toluene were added in a dropwise manner over a period of about one hour. When the evolution of water stopped, the reaction mixture was cooled and the toluene was removed in vacuo. The yield of octadecyl phenol-formaldehyde condensate was 420 grams, or about 99%. The number average molecular weight (VPO) of the dialyzed polymer was measured as 4,110, and its weight average molecular weight (GPC) was 12,000. The melting point and heat of fusion of the polymer were −4.0° C. and 4 J/g, respectively.

EXAMPLE 12

As another example of the preparation of an alkylated phenol-formaldehyde condensate polymer of the present invention, Example 11 was repeated except, that a molar equivalent of tetradecylphenol produced in accordance with Example 2 was substituted for the octadecylphenol thereof. The yield of tetradecyl phenol-formaldehyde condensate was 99%, and the weight average molecular weight (GPC) of the dialyzed polymer was 8,300, and its number average molecular weight was 4,500 by GPC.

EXAMPLE 13

As another example of the preparation of an alkylated phenol-formaldehyde condensate polymer of the present invention, Example 11 was repeated, except that a molar equivalent of pentadecylphenol produced in accordance with Example 3 was substituted for the octadecylphenol thereof The yield of pentadecyl phenol-formaldehyde condensate was 84%, and the weight-average molecular weight (GPC) of the dialyzed polymer was 7,200, and its number average molecular weight was 3,900 by GPC.

EXAMPLE 14

As another example of the preparation of an alkylated phenol-formaldehyde condensate polymer of the present invention, Example 11 was repeated, except that a molar equivalent of hexadecylphenol produced in accordance with Example 4 was substituted for the octadecylphenol thereof. The yield of hexadecyl phenol-formaldehyde condensate was 99%, and the weight average molecular weight (GPC) of the dialyzed polymer was 8,100, and its number average molecular weight was 3,230 by VPO.

EXAMPLE 15

As another example of the preparation of an alkylated phenol-formaldehyde condensate polymer of the present invention, Example 11 was repeated, except that a molar equivalent of heptadecylphenol produced in accordance with Example 5 was substituted for the octadecylphenol thereof. The yield of heptadecyl phenol-formaldehyde condensate was 94%, and the weight average molecular weight (GPC) of the dialyzed polymer was 8,400, and its number average molecular weight was 3,700 by VPO. The melting point and heat of fusion of the polymer were $-9.7°$ C. and 1 J/g, respectively.

EXAMPLE 16

As another example of the preparation of an alkylated phenol-formaldehyde condensate polymer of the present invention, Example 11 was repeated, except that a molar equivalent of nonadecylphenol produced in accordance with Example 6 was substituted for the octadecylphenol thereof. The yield of nonadecyl phenol-formaldehyde condensate was 99%, and the weight average molecular weight (GPC) of the dialyzed polymer was 8,800, and its number average molecular weight was 3,970 by VPO. The melting point and heat of fusion of the polymer were 22.2° C. and 34 J/g, respectively.

EXAMPLE 17

As another example of the preparation of an alkylated phenol-formaldehyde condensate polymer of the present invention, Example 11 was repeated, except that a molar equivalent of eicosylphenol produced in accordance with Example 7 was substituted for the octadecylphenol thereof. The yield of eicosyl phenol-formaldehyde condensate was 97%, and the weight average molecular weight (GPC) of the dialyzed polymer was 12,000, and the number average molecular weight was 5,250 by VPO. The melting point and heat of fusion of the polymer were 22.6° C. and 22 J/g, respectively.

EXAMPLE 18

As another example of the preparation of an alkylated phenol-formaldehyde condensate polymer of the present invention, Example 11 was repeated, except that a molar equivalent of the mixture of alkylphenols produced in accordance with Example 8 was substituted for the octadecylphenol thereof. The yield of this alkyl phenol-formaldehyde condensate was 99%, and the number average molecular weight (VPO) of the dialyzed polymer was 3,050, and its weight average molecular weight (GPC) was 8,000. The melting point and heat of fusion of the polymer were 40.1° C. and 19 J/g, respectively.

EXAMPLE 19

As another example of the preparation of an alkylated phenol-formaldehyde condensate polymer of the present invention, Example 11 was repeated, except that a molar equivalent of the mixture of alkylphenols produced in accordance with Example 9 was substituted for the octadecylphenol thereof. The yield of this alkyl phenol-formaldehyde condensate was 87%, and the weight average molecular weight (GPC) of the dialyzed polymer was 8,100, and its number average molecular weight was 5,700 by GPC. The melting point and heat of fusion of the polymer were 51.8° C. and 62 J/g, respectively.

EXAMPLE 20

As another example of the preparation of an alkylated phenol-formaldehyde condensate polymer of the present invention, Example 11 was repeated, except that a molar equivalent of the mixture of alkylphenols produced in accordance with Example 10 was substituted for the octadecylphenol thereof. The yield of this alkyl phenol-formaldehyde condensate was 99%, the number average molecular weight (VPO) of the dialyzed polymer was 3,830, and its weight average molecular weight (GPC) was 10,200. The melting point and heat of fusion of the polymer were 67.7° C. and 90 J/g, respectively.

EXAMPLE 21

As another example of the preparation of an alkylated phenol-formaldehyde condensate polymer of the present invention, Example 11 was repeated, except that octadecylphenol produced in accordance with Comparative Example 1 was used. The yield of octadecyl phenol-formaldehyde condensate was 90%, and the weight average molecular weight (GPC) of the dialyzed polymer was 10,900, and its number average molecular weight was 4,100 by GPC. The melting point and heat of fusion were $-10.2°$ C. and 1 J/g, respectively.

EXAMPLE 22

As another example of the preparation of an alkylated phenol-formaldehyde condensate polymer of the present invention, Example 11 was repeated, except that 0.6 molar equivalent of hexadecylphenol produced in accordance with Example 4, and 0.4 molar equivalent of the mixture of alkylphenols produced in accordance with Example 8 ($C_{20}$ to $C_{24}$) was substituted for the octadecylphenol thereof. The yield of this alkyl phenol-formaldehyde condensate was 98%, and the weight average molecular weight (GPC) of the dialyzed polymer was 5,600. The melting point and heat of fusion were $+3°$ C. and 11 J/g, respectively

COMPARATIVE EXAMPLE 2

In order to demonstrate the criticality of the linearity of the alkyl groups used in the alkylated phenol-aldehyde condensates of the present invention, the octadecyl phenol-formaldehyde condensates produced in accordance with Example 11 and Example 21 were tested in both light and heavy oils. Example 11 was prepared from octadecylphenol produced in accordance with Example 1, which consisted of 50 mole % 2-substituted alkylate and 50 mole %$\geq$3-substituted alkylate. Example 21 was prepared from octadecylphenol produced in accordance with Comparative Example 1, which consisted of 35 mole % 2-substituted alkylate and 65 mole %≧3-substituted alkylate. As a result, the octadecylphenol-formaldehyde condensate produced in accordance with Example 21 was more branched than the octadecyl phenol-formaldehyde condensate produced in accordance with Example 11 (i.e., it included less than 40% of the linear alkyl groups attached at the 2-position). Pour points for the respective oils were measured according to ASTM D 97 method, and the results are set forth in Table 1 below. These results demonstrate that a mere 15 mole % reduction in alkylate containing a pendant methyl group on the 2-carbon and a corresponding increase in alkylate having substitution on the 3- or higher carbon (collectively) decreases pour point depressancy significantly (compare runs 1, 2 and 5). Comparing runs 1, 3 and 6, it will be observed that while increasing the concentration of the additive of Example 21 imparts some pour dependency relative to the base oil, it is not nearly as much as the additive in Example 11. Note further the significant increase in pour depressancy in Basestock B of the additive of Run No. 4 versus Run No. 7 at a 0.2% concentration.

Moreover, FIG. 3 graphically illustrates the relationship between pour point and concentration of the additive prepared in accordance with Example 11.

TABLE 1

| Run No. | Additive | Additive Concentration (Wt. %) | (ASTM D 97) Pour Point (°F.) Lube Basestock A* | (ASTM D 97) Pour Point (°F.) Lube Basestock B* |
|---|---|---|---|---|
| 1 | Base Oil | 0 | +10, +15, +15 | +15, +15, +20 |
| 2 | Example 11 | 0.05 | −10, −10, −10 | N/P |
| 3 | Example 11 | 0.10 | −20, −25, −25 | N/P |
| 4 | Example 11 | 0.20 | −35, −35, −35 | −5, −10, −10 |
| 5 | Example 21 | 0.05 | 10, 15, 15 | N/P |
| 6 | Example 21 | 0.10 | −10, −10, −10 | N/P |
| 7 | Example 21 | 0.20 | −25, −25, −30 | 10, 10, 20 |

N/P = not performed
*Throughout these examples, Lube Basestocks A and B were as follows:
Lube Basestock A
A solvent 150 Neutral oil which is a solvent-refined hydrocarbon lube basestock characterized by a viscosity of 150-160 SUS at 100° F., a viscosity index of 95, and a pour point of about +15° F.
Lube Basestock B
A solvent 600 Neutral oil which is a solvent-refined hydrocarbon lube basestock characterized by a viscosity of about 600 SUS at 100° F., a viscosity index of about 95, and a pour point of about +15° F.

COMPARATIVE EXAMPLE 3

In order to demonstrate the significance of the intra-molecular carbon average of alkylate side chain in a polymer relative to the corresponding inter-molecular carbon average of a blend of polymer, the alkyl phenol-formaldehyde condensate produced in accordance with Example 22 was tested for its pour depressancy in Lube Basestock A. The product of Example 22 was an alkyl phenol-formaldehyde condensate polymer produced from a mixture of hexadecylphenol (i.e., Example 4) and heneicosyl phenol (i.e., Example 8) such that the molar average of carbon atoms in the alkyl groups was 18. In addition, several other blends of lube oil and additives were tested as shown in Table 2, and the results reported therein. For run 9 the average inter-molecular carbon number average is 18 based on a blend of $C_{16}$ alkylate (intra-molecular carbon average) derived polymer and $C_{21}$ alkylate (intra-molecular average) derived polymer. The results of pour point depressancy tests thereof are set forth in Table 2 below, and demonstrate that the intra-molecular average of carbon atoms in the side chain of the alkylate portion within a given polymer molecule influences pour depressancy to a greater extent than that achieved by a blend of polymers (i.e., run 9) wherein the inter-molecular carbon average of the polymer blend is the same as said intra-molecular carbon average of the reference polymer (i.e., run 8), but the individual intra-molecular carbon average of each component polymer in the blend differs from the intra-molecular carbon average of the reference polymer (i.e., run 8).

TABLE 2

| Run No. | Lube Basestock | Additive | Average Carbon No. of Additive | Additive Conc. (Wt. %) | ASTM D 97 Pour Pt. (°F.) |
|---|---|---|---|---|---|
| 8 | A | Example 22 | 18 | 0.2 | −25, −30, −30 |
| 9 | A | Ex. 14/Ex. 18 | 16/21 | 0.12/0.08 | +5, 0, 0 |
| 10 | A | Example 14 | 16 | 0.2 | +15, +10, +10 |
| 11 | A | Example 18 | 21 | 0.2 | 0, −5, −5 |

COMPARATIVE EXAMPLE 4

In order to demonstrate the criticality of the length of the alkyl group used in the alkylated phenol-aldehyde condensates of the present invention, a series of experiments were conducted in which the additives used differed only in the length of these terminally attached alkyl groups. In particular, blends of such alkylated phenol-formaldehyde condensates were prepared based upon an alpha-olefin or a blend of alpha-olefins such that the average carbon numbers varied from about 14 up to 30. The blends were made with lubricating oil Basestock A with an amount of each such additive of 0.2 wt. % of the blend. The respective pour points for these blends were then measured according to ASTM D-97 method, and the results are listed in Table 3 and graphically shown in FIG. 1. Note that the additive of Example 19 is derived from an olefin mixture having 30 mole % of the olefins greater than 26 carbons, and hence is outside the literal scope of the claimed invention hereof, as is also the additive of Example 20. It is further noted that for lubricating oils, average carbon numbers of 14 to 16 were not effective for those lube oils tested, in contrast to fuels as shown in Table 7, where they were effective.

These experiments were then repeated, with the exception that a different oil composition, namely lube Basestock B, was employed, and the results are listed in Table 3 and are graphically shown in FIG. 2.

TABLE 3

| Run No. | Additive | Average Carbon No. of Additive | Pour Point (°F.) (ASTM D 97) Lube Basestock A | Pour Point (°F.) (ASTM D 97) Lube Basestock B |
|---|---|---|---|---|
| 12 | Example 12 | 14 | +15, +15, +10 | N/P |
| 13 | Example 13 | 15 | +15, +15, +10 | N/P |
| 14 | Example 14 | 16 | +15, +15, +15 | +20, +15, +15 |
| 15 | Example 15 | 17 | −25, −25, −30 | +20, +15, +15 |
| 16 | Example 11 | 18 | −35, −35, −35 | −5, −10, −10 |
| 17 | Example 16 | 19 | −20, −20, −20 | −10, −10, −15 |
| 18 | Example 17 | 20 | −5, −5, −5 | −15, −15, −15 |
| 19 | Example 18 | 21 | 0, −5, −5 | −5, −5, −5 |

TABLE 3-continued

| Run. No. | Additive | Average Carbon No. of Additive | Pour Point (°F.) (ASTM D 97) Lube Basestock A | Pour Point (°F.) (ASTM D 97) Lube Basestock B |
|---|---|---|---|---|
| 20 | Example 19 | 26 | +15, +15, +10 | N/P |
| 21 | Example 20 | 30 | +15, +15, +10 | +15, +10, +10 |

Referring next to Table 3 it can be seen that for Basestock A (see run 1 for pour point of Oil A alone) the most effective additive as a pour point depressant was derived from a $C_{18}$ average alkylate (i.e., run 16) and for Basestock B (see run 1 for pour point of Oil B alone), a much heavier base oil with higher molecular weight waxes, the most effective additive as a pour point depressant was derived from a $C_{20}$ average alkylate (i.e., run 18). Moreover, as the alkylate average carbon number of the additives used in Lube Oil A and Lube Oil B deviates from the optimum carbon number averages identified above for each oil, the pour depressancy drops off significantly. For example, decreasing the average alkylate average carbon number from the optimum of 18 to 16 (i.e, run 14) results in no pour depressancy at the concentration employed. Similarly, increasing the average carbon number from the optimum of 18 to 26 (i.e., run 20) for Oil A also results in no pour depressancy. Referring to the Oil B runs, decreasing the average carbon number from the optimum of 20 to 17 (i.e., run 15) gives no pour depressancy, and increasing the carbon number to 30 (i.e., run 21) gives similar results.

Thus, at a given concentration, an oil will possess an optimum alkylate average carbon number vis-a-vis pour depressancy within a very narrow range of average carbon numbers, depending on the type of waxes present therein. This optimum will vary typically from about 18 to 20 for most oils.

COMPARATIVE EXAMPLE 5

Analysis of the low temperature pumping of oils containing the homologous series of alkylated phenol-formaldehyde condensates was measured with a Mini-Rotary Viscometer in accordance with ASTM D 3829. Lube Basestock A was blended with an ethylene-propylene viscosity index improver containing 47% ethylene in order to produce a 10W-40 multi-grade oil. The additives produced in Examples 11-20 were blended into this formulation at 0.2 wt. % and the apparent viscosity (mPa·s) and yield stress (Pa) were measured. The results obtained are set forth in Table 4 below.

TABLE 4

| Run No. | Additive | Average Carbon Number of Additive | MRV Results @ -25° C. (ASTM D 3829) Viscosity (mPa · s) | MRV Results @ -25° C. (ASTM D 3829) Yield Stress (Pa) |
|---|---|---|---|---|
| 22 | Example 12 | 14 | >10⁶ | >175 |
| 23 | Example 13 | 15 | N/P | N/P |
| 24 | Example 14 | 16 | >10⁶ | >175 |
| 25 | Example 15 | 17 | N/P | N/P |
| 26 | Example 11 | 18 | 28,000 | 35 |
| 27 | Example 16 | 19* | 23,000 | <35 |
| 28 | Example 17 | 20 | 34,300 | 105 |
| 29 | Example 18 | 21 | >10⁶ | >175 |
| 30 | Example 19 | 26 | >10⁶ | >175 |
| 31 | Example 20 | 30 | >10⁶ | >175 |

Referring to Table 4, it will be understood that MRV test results indicate the propensity of oil to flow at low temperatures when subjected to a shear stress. This property is important to avoid plugging of oil screens in the pump well of the engine. Accordingly, the lower the apparent viscosity and yield stress, the better and the easier it is to get the oil to flow through the oil pump at low operating temperatures. Moreover, MRV test results correlate well with pour point depressancy. For example, it can be seen that the optimum alkylate carbon number average from Table 4 is 19 (i.e., run 27), which corresponds well with the results in Table 3 where the optimum alkylate carbon average was 18 for Oil A. It should also be noted that there was a drop in performance at alkylate average carbon numbers of 16 or lower and 21 or higher. For run 27, however, $(C_{19})$ a 43-fold improvement in apparent viscosity performance, and at least a five-fold increase in yield stress performance, is achieved relative to runs 22 and 31.

EXAMPLE 23

A sulfurized alkylated phenol-formaldehyde condensate polymer in accordance with the present invention was prepared by charging into a four-necked, 1 liter, round bottom flask, equipped with a mechanical stirrer, a thermometer, an addition funnel, and a nitrogen inlet, 250 grams of a low molecular weight octadecyl phenol-formaldehyde condensate produced in accordance with Example 26 below (i.e., $M_n = 2,200$ and $M_w = 3,000$ by GPC). This mixture was then heated to 70° C. under a blanket of nitrogen, and with stirring 52 grams of commercial sulfur dichloride were added dropwise over a period of 45 minutes, with the temperature being maintained below 82° C. After completion of this addition, the reaction mixture was soaked at 82° C. for 10 minutes, and then heated to 100° C. and sparged with nitrogen for two hours. The yield of the sulfurized octadecyl phenol-formaldehyde condensate was 177 grams or about 66%. The product had an weight average molecular weight of 35,000 by GPC, and a number average molecular weight of 8,300 by GPC.

EXAMPLE 24

A branched backbone, alkylated phenol-formaldehyde condensate polymer within the scope of the present invention was then prepared by charging into a four-necked, 1 liter, round bottom flask, equipped with a mechanical stirrer, a thermometer, an addition funnel, a nitrogen inlet tube, and a Dean-Stark Trap with reflux condenser, 459 grams of the alkylated phenol produced in accordance with Example 8, 42 grams of toluene, and 0.5 grams of p-toluenesulfonic acid monohydrate. Furthermore, 34.8 grams of phenol were added to the alkylated phenol at this point, and the mixture was then stirred under a nitrogen blanket and heated to reflux conditions, during such refluxing 32 grams of trioxane in 70 grams of toluene were then added dropwise over a period of one hour, and when the evolution of water stopped, the reaction mixture was cooled and the toluene was removed in vacuo. The yield of the condensate was 456 grams, or 90%, having a number average molecular weight (VPO) of 2950 and weight average molecular weight of 8,400 by GPC.

COMPARATIVE EXAMPLE 6

The pour point depressancies of a low molecular weight (i.e., $M_n = 2,200$ by GPC; $M_w = 3,000$ by GPC) octadecyl phenol-formaldehyde condensate produced in accordance with Example 26 below and the sulfurized octadecyl phenol-formaldehyde condensate produced in accordance with Example 23, which employed the same low molecular weight $C_{18}$ alkyl phenol-formaldehyde condensate of Example 26 for sulfurization, were tested in both a light (Lube Basestock A) and a heavy (Lube Basestock B) oil. Pour points for the oils were measured according to ASTM D-97 method, and the results are set forth in Table 5 below.

TABLE 5

| | | | (ASTM D97) Pour Point (°F.) | |
|---|---|---|---|---|
| Run No. | Lube Base-stock | Additive Concentration (wt. %) | Low Molecular Weight Octadecyl Phenol Formaldehyde Condensate | Sulfurized Octadecyl Phenol Formaldehyde Condensate |
| 32 | A | 0.00 | +15, +15 | +15, +15 |
| 33 | A | 0.05 | +10, +15, +10, +10 | −10, −10, −15 |
| 34 | A | 0.10 | −5, −5, −10, −10 | −20, −25, −25 |
| 35 | A | 0.20 | −20, −15, −15, −15 | −40, −40, −35 |
| 36 | B | 0.00 | +20, +20 | +20, +20 |
| 37 | B | 0.20 | +20, +20 | −10, −10 |

Referring to Table 5, it can be seen that increasing the weight average molecular weight of a $C_{18}$ alkylate derived alkyl phenol-formaldehyde condensate from 3,000 to 35,000 by sulfurization improved the pour point performance. Thus, the sulfurized alkyl phenol-formaldehyde condensate in Oil A showed good pour point depressancy at a 0.05 wt. % concentration, whereas the unsulfurized low molecular weight alkyl phenol-formaldehyde condensate did not, until the concentration was increased to 0.2 wt. %. Moreover, it will be recalled from Table 3 that the optimum alkylate carbon number average was 20 and not 18 for Oil B. Thus, runs 36 and 37 illustrate that the dominant criterion for pour depressancy is the identification of the optimum alkylate average carbon number (and essential linearity thereof) for a particular oil. However, the performance of the condensate at a particular alkylate carbon number average can still be improved by increasing its molecular weight, as illustrated by runs 36 and 37.

COMPARATIVE EXAMPLE 7

An analysis of the flow properties of oils containing the additives produced in Examples 18 ($C_{21}$ average in alkylate) and Example 24 ($C_{21}$ average in alkylate, molecular weight enhanced with phenol), and more particularly of the low temperature properties of an engine oil, were measured according to a mini-rotary viscometer (MRV) in accordance with ASTM D-3829. The additives produced in these examples were thus blended with a 10W-40 oil formulation, the apparent viscosity (VIS) was measured in milli-Pascal seconds, and the yield stress (YS) was measured in Pascals. The results obtained are set forth in Table 6 below.

TABLE 6

| Run No. | Additive | Base Oil | VIS (mPa · s) | YS (Pascal) |
|---|---|---|---|---|
| 38 | Example 18 | 10W-40 | 1.6 × 10⁶ | 525 |
| 39 | Example 18 | 10W-40 | 1.6 × 10⁶ | 525 |
| 40 | Example 24 | 10W-40 | 24,400 | 35 |
| 41 | Example 24 | 10W-40 | 26,000 | 70 |

Referring to Table 6, it can be seen that increasing the $M_w$ of a $C_{21}$ alkylate derived alkyl phenol-formaldehyde condensate from 8,000 to 8,400 with a phenol crosslinking agent improves MRV performance. However, it is also believed that the slight increase in molecular weight achieved does not account solely for the significant improvement in performance achieved. More specifically, it is further believed that even at equal molecular weights, a condensate with a branched backbone, as achieved with phenol, will yield better performance relative to a condensate polymer with linear backbone. Thus, the branching achieved with phenol is also believed to account for the performance observed in Table 6.

COMPARATIVE EXAMPLE 8

The cloud point and pour point depressancies of various alkyl phenol-formaldehyde condensates (as described in the designated Example number) produced in accordance with the present invention, except for those additives derived from Examples 19 and 20 (which are outside the scope of the present invention), were then tested in various middle distillate petroleum fuels. Cloud points for these fuels were measured according to ASTM D 2500 method, and pour points for these fuels were measured according to ASTM D 97 method. The middle distillate fuels used in these examples are designated below as fuels A through F, whose properties were as follows in Table 7:

TABLE 7

| | Fuel A | Fuel B | Fuel C | Fuel D | Fuel E | Fuel F |
|---|---|---|---|---|---|---|
| Cloud Point (°F.) (ASTM D 2500) | +2 | +8 | +12 | +14 | 0 | +4 |
| Pour Point (°F.) (ASTM D 97) | −15 | +5 | −10 | +10 | −5 | −5 |
| API Gravity (degrees) (ASTM D 287) | 27.1 | 40.9 | 34.7 | 35.1 | 36.3 | 34.4 |
| Distillation (°F.) ASTM D 86 | | | | | | |
| IBP[1] | 387 | 370 | 318 | 384 | 365 | 368 |
| 10% | 437 | 407 | 408 | 439 | 395 | 424 |
| 20% | 460 | 427 | 440 | 461 | 416 | 452 |
| 50% | 518 | 482 | 500 | 527 | 481 | 507 |
| 90% | 615 | 576 | 615 | 630 | 602 | 600 |
| FBP[2] | 660 | 608 | 670 | 668 | 662 | 649 |

[1]Initial boiling point
[2]Final boiling point

The alkyl phenol-formaldehyde condensates used in this example corresponded to the specific series of alpha-olefins set forth in the designated Example numbers, and ranged from 14 to 30 average carbon number. The results obtained are set forth in Table 8 below.

TABLE 8

Effect of Various Alkyl Phenol-Formaldehyde Condensates on the Cloud Points and Pour Points of Diesel Fuels

| | Additive | | Cloud Point (°F.) | | | Pour Point (°F.) | | |
|---|---|---|---|---|---|---|---|---|
| | | | Concentration (Wt. %) | | | | | |
| Run No. | Example | Average Carbon No. | 0.0 | 0.1 | 0.2 | 0.0 | 0.1 | 0.2 |
| | | | Fuel A | | | | | |
| 42 | 12 | $C_{14}$ | +2 | +2 | +2 | −15 | −15 | −25 |
| 43 | 14 | $C_{16}$ | +2 | +2 | 0 | −15 | −40 | −45* |
| 44 | 11 | $C_{18}$ | +2 | −6 | −8* | −15 | −30 | −35 |
| 45 | 18 | $C_{21}$ | +2 | −4 | −6 | −15 | −25 | −25 |
| 46 | 19 | $C_{26}$ | +2 | 0 | 0 | −15 | −20 | −15 |
| 47 | 20 | $C_{30}$ | +2 | N/P | N/P | −15 | −15 | −15 |
| | | | Fuel B | | | | | |
| 48 | 12 | $C_{14}$ | +8 | +8 | +8 | +5 | +5 | +5 |
| 49 | 14 | $C_{16}$ | +8 | +8 | +8 | +5 | +5 | +5 |
| 50 | 11 | $C_{18}$ | +8 | +6 | +4* | +5 | 0 | 0* |
| 51 | 18 | $C_{21}$ | +8 | +8 | +8 | +5 | +10 | +10 |
| 52 | 19 | $C_{26}$ | +8 | N/P | N/P | +5 | +10 | +10 |
| 53 | 20 | $C_{30}$ | +8 | N/P | N/P | +5 | +5 | +10 |
| | | | Fuel C | | | | | |
| 54 | 12 | $C_{14}$ | +12 | +12 | +12 | +10 | +10 | +10 |
| 55 | 14 | $C_{16}$ | +12 | +10 | +10 | −10 | −40 | −50* |
| 56 | 11 | $C_{18}$ | +12 | +6 | +4 | −10 | −20 | −30 |
| 57 | 18 | $C_{21}$ | +12 | +4 | +4* | −10 | −10 | −10 |
| 58 | 19 | $C_{26}$ | +12 | +10 | +10 | −10 | −5 | −5 |
| 59 | 20 | $C_{30}$ | +12 | N/P | N/P | −10 | −10 | −10 |
| | | | Fuel D | | | | | |
| 60 | 12 | $C_{14}$ | +14 | +12 | +12 | +10 | +10 | +5 |
| 61 | 14 | $C_{16}$ | +14 | +14 | +10 | +10 | −25 | −35* |
| 62 | 11 | $C_{18}$ | +14 | +8 | +8* | +10 | −5 | −5 |
| 63 | 18 | $C_{21}$ | +14 | +10 | +10 | +10 | +5 | +5 |
| 64 | 19 | $C_{26}$ | +14 | +14 | +16 | +10 | +10 | +10 |
| 65 | 20 | $C_{30}$ | +14 | N/P | N/P | +10 | +10 | +10 |
| | | | Fuel E | | | | | |
| 66 | 12 | $C_{14}$ | 0 | −4 | −4 | −5 | −5 | −10 |
| 67 | 14 | $C_{16}$ | 0 | −2 | −4 | −5 | −25 | −30* |
| 68 | 11 | $C_{18}$ | 0 | −8 | −10* | −5 | −15 | −15 |
| 69 | 18 | $C_{21}$ | 0 | N/P | N/P | −5 | N/P | N/P |
| 70 | 19 | $C_{26}$ | 0 | 0 | 0 | −5 | −5 | −5 |
| 71 | 20 | $C_{30}$ | 0 | 0 | N/P | −5 | −5 | −5 |
| | | | Fuel F | | | | | |
| 72 | 12 | $C_{14}$ | +4 | +2 | +4 | −5 | −10 | −10 |
| 73 | 14 | $C_{16}$ | +4 | 0 | +2 | −5 | −35 | −40* |
| 74 | 11 | $C_{18}$ | +4 | −2 | −4* | −5 | −15 | −20 |
| 75 | 18 | $C_{21}$ | +4 | N/P | N/P | −5 | N/P | N/P |
| 76 | 19 | $C_{26}$ | +4 | +4 | +6 | −5 | −5 | −5 |
| 77 | 20 | $C_{30}$ | +4 | +4 | +2 | −5 | 0 | 0 |

Referring to Table 8, the asterisks indicate the most effective alkylate average carbon number for each fuel relative to cloud point and pour point. In most instances the optimum alkylate carbon number for pour depressancy is slightly lower than for cloud point depressancy. It should also be noted how quickly performance deteriorates relative to zero concentration of the additive as the alkylate average carbon number deviates from the optimum for each particular test. Moreover, this deterioration appears to occur faster as the average carbon number decreases from the optimum rather than increases. All of the optimum values of Table 8 are clustered within the $C_{12}$ to $C_{21}$ range.

COMPARATIVE EXAMPLE 9

A low temperature flow test was conducted on the same fuels employed and described in comparative Example 8 in Table 7. The Low Temperature Flow Test (LTFT) is a laboratory test which was developed to provide a better correlation than cloud point or pour point with the low temperature performance of automotive diesel fuels. In this method (ASTM D 4539), the temperature of a series of samples of test fuel is lowered at a controlled cooling rate of 1° C. per hour. Commencing at a desired test temperature, and at 1° C. intervals thereafter, a separate sample from the series is filtered through a 17-μm screen until a minimum LTFT pass temperature is obtained. The minimum LTFT pass temperature is the lowest temperature at which a minimum of 180 ml of fuel can be filtered in 60 seconds or less. The results of the LTFT tests are shown in Table 9 below. For each of runs 78-83, hexadecyl phenol-formaldehyde condensate produced in accordance with Example 14 was added to the designated fuel at the indicated concentration. The results demonstrate an improvement in the low temperature filterability of all fuel compositions containing the additive except Fuel B, for which Table 8 shows an optimum alkylate carbon average value of 18.

TABLE 9

Effect of Hexadecyl Phenol-Formaldehyde Condensate on Low Temperature Filterability
Low Temperature Flow Test (°F.)

| | | Additive Concentration | |
|---|---|---|---|
| Run No. | Fuel | 0.0 Wt. % | 0.2 Wt. % |
| 78 | A | +2 | −12 |
| 79 | B | +8 | +8 |
| 80 | C | +12 | −6 |
| 81 | D | +14 | +10 |
| 82 | E | 0 | −8 |

TABLE 9-continued

Effect of Hexadecyl Phenol-Formaldehyde Condensate
on Low Temperature Filterability
Low Temperature Flow Test (°F.)

| Run No. | Fuel | Additive Concentration | |
|---|---|---|---|
| | | 0.0 Wt. % | 0.2 Wt. % |
| 83 | F | +4 | −8 |

EXAMPLE 25

In order to demonstrate the effect of the molecular weight of the alkylated phenol-aldehyde condensates of the present invention with respect to its ability to reduce the pour point of lubricating oils, the octadecylphenol produced in accordance with Example 1 was vacuum distilled to produce pure monooctadecylphenol (i.e., without dialkylate). The reaction set forth in Example 11 was repeated with the exception that aliquots were taken during the course of the polymerization. The polymer in each aliquot was isolated by dialysis and its weight average and number average molecular weight were determined by gel permeation chromatography.

The above procedure was then repeated, with the exception that the heptadecylphenol produced in accordance with Example 5 was substituted for octadecylphenol.

Each isolated polymer was blended in Lube Basestock A at 0.2 wt. %. The respective pour points for these blends were then measured according to the ASTM D-97 method. The results are listed in Table 10, and are shown graphically in FIG. 4. These results demonstrate the greater effectiveness of the higher molecular weight alkylated phenol-formaldehyde condensates of the present invention.

TABLE 10

Alkyl Phenol-Formaldehyde Condensate

| Run No. | Lube Basestock A | Avg. Carbon Number of Additive | Wt.-Avg. Molecular Wt. (GPC) | No. Avg. Molecular Weight (GPC) | Additive Concentration (Wt. %) | ASTM D- Pour Po (°F.) |
|---|---|---|---|---|---|---|
| 84 | A | 18 | 3,000 | 2,200 | 0.2 | −15, −15, |
| 85 | A | 18 | 12,000 | 5,400 | 0.2 | −35, −35, |
| 86 | A | 18 | 18,000 | 7,600 | 0.2 | −40, −45, |
| 87 | A | 17 | 5,500 | 1,500 | 0.2 | 0, 0, +5 |
| 88 | A | 17 | 6,000 | 2,100 | 0.2 | −15, −15, |
| 89 | A | 17 | 8,400 | 2,500 | 0.2 | −20, −25, |
| 90 | A | 17 | 32,000 | 8,200 | 0.2 | −30, −30, |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A polymer composition capable of improving the low temperature flow properties of hydrocarbon oil comprising the condensation reaction product of reactants comprising alkylated phenol comprising at least 80 mole % difunctional alkylated phenol, and aldehyde wherein:

(a) said polymer composition has a number average molecular weight of at least about 3,000 and a molecular weight distribution of at least about 1.5;
    (b) in said alkylated phenol reactant the alkyl groups:
        (i) are essentially linear; (ii) have between 6 and 50 carbon atoms; and (iii) have an average number of carbon atoms between about 12 and 26; and
    (c) not more than about 10 mole % of the alkyl groups on said alkylated phenol have less than 12 carbon atoms and not more than about 10 mole % of the alkyl groups on said alkylated phenol have more than 26 carbon atoms.

2. The polymer composition of claim 1 wherein said aldehyde is formaldehyde.

3. The polymer composition of claim 1 wherein said essentially linear alkyl groups comprise at least 40 mole % alpha methyl substituted linear alkyl groups.

4. The polymer composition of claim 1 wherein said essentially linear alkyl groups comprise at least 50 mole % alpha methyl substituted linear alkyl groups.

5. The polymer composition of claim 1 wherein said average carbon number of said alkyl groups of said alkylated phenol is between about 14 and 24.

6. The polymer composition of claim 5 wherein said average carbon number of said alkyl groups of said alkylated phenol is between about 16 and 22.

7. The polymer composition of claim 1 wherein said average carbon number of said alkyl groups of said alkylated phenol is between about 18 and 20.

8. The polymer composition of claim 1 wherein said average carbon number of said alkyl groups of said alkylated phenol is between about 16 and 19.

9. The polymer composition of claim 1 wherein said average carbon number of said alkyl groups of said alkylated phenol is between about 17 and 21.

10. The polymer composition of claim 1 wherein said molecular weight distribution is from about 1.5 to about 34.

11. The polymer composition of claim 1 wherein said number average molecular weight is at least about 4,000.

12. The polymer composition of claim 1 wherein said number average molecular weight is from about 3,000 to about 60,000.

13. The polymer composition of claim 1 wherein said polymer is sulfurized.

14. The polymer composition of claim 1 wherein said polymer forming reactants further include a comonomer having the formula:

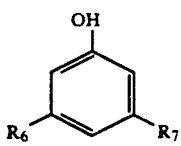
(II)

wherein $R_6$ and $R_7$ are selected from the group consisting of hydrogen, alkyl, aryl, alkoxy, aryloxy, alkyl mercapto and halogen.

15. The polymer composition of claim 1 wherein said polymer forming reactants further include a comonomer having the formula:

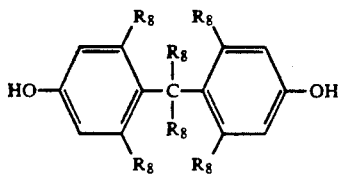
(III)

wherein $R_8$ is independently selected from the group consisting of hydrogen, alkyl, aryl, alkoxy, aryloxy, alkyl mercapto, and halogen.

16. The polymer composition of claims 14 or 15 wherein said comonomer is present in an amount of less than about 10 wt. % of said polymer.

17. A fuel oil composition comprising a major amount of a fuel oil and a low temperature flow improving amount of a polymeric additive comprising the condensation reaction product of reactants comprising alkylated phenol, comprising at least 80 mole % difunctional alkylated phenol, and aldehyde, wherein:

(a) said polymer composition has a number average molecular weight of at least about 4,000 and a molecular weight distribution of at least about 1.5;

(b) in said alkylated phenol reactant the alkyl groups: (i) are essentially linear; (ii) have between 6 and 50 carbon atoms; and (iii) have an average number of carbon atoms between about 12 and 26; and (c) not more than about 10 mole % of the alkyl groups on said alkylated phenol have less than 12 carbon atoms and not more than about 10 mole % of the alkyl groups on said alkylated phenol have more than 26 carbon atoms.

18. The fuel oil composition of claim 17 comprising between about 0.005 and 10 wt. % of said additive.

19. The fuel oil composition of claim 17 comprising between about 0.01 and 2 wt. % of said additive.

20. The fuel oil composition of claim 17 wherein said essentially linear alkyl groups comprise at least 40 mole % alpha methyl substituted linear alkyl groups.

21. The fuel oil composition of claim 17 wherein said polymeric additive is sulfurized.

22. The fuel oil composition of claim 21 wherein said polymeric additive contains between about 5 and 10 wt. % sulfur.

23. The fuel oil composition of claim 17 wherein said condensate-forming reactants further include comonomer represented by the formula:

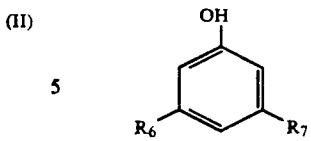
(II)

wherein $R_6$ and $R_7$ are selected from the group consisting of hydrogen, alkyl, aryl, alkoxy, aryloxy, alkyl mercapto, and halogen.

24. The fuel oil composition of claim 17 wherein said condensate-forming reactants further include comonomer represented by the formula:

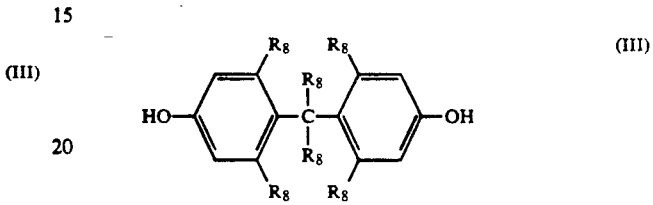
(III)

wherein $R_8$ is independently selected from the group consisting of hydrogen, alkyl, aryl, alkoxy, aryloxy, alkyl mercapto, and halogen.

25. The fuel oil composition of claim 17 wherein said essentially linear alkyl groups comprise at least 50 mole % alpha methyl substituted linear alkyl groups.

26. The fuel oil composition of claim 17 wherein said average carbon number of said alkyl groups of said alkylated phenol is between about 14 and 24.

27. The fuel oil composition of claim 17 wherein said average carbon number of said alkyl groups of said alkylated phenol is between about 16 and 22.

28. The fuel oil composition of claim 17 wherein said average carbon number of said alkyl groups of said alkylated phenol is between about 18 and 20.

29. The fuel oil composition of claim 17 wherein said average carbon number of said alkyl groups of said alkylated phenol is between about 16 and 19.

30. The fuel oil composition of claim 17 wherein said average carbon number of said alkyl groups of said alkylated phenol is between about 17 and 21.

31. The fuel oil composition of claim 17 wherein said molecular weight distribution is from about 1.5 to about 34.

32. The fuel oil composition of claim 17 wherein said molecular average molecular weight is from about 3,000 to about 60,000.

33. A method for producing a polymeric additive suitable for improving the low temperature flow properties of hydrocarbon oil which comprises (1) providing alkylated phenol, comprising at least 80 mole % difunctional alkylated phenol, derived from the reaction of (a) phenol and (b) linear alpha-olefin having (i) from 6 to 50 carbon atoms, (ii) an average carbon number of from about 12 to 26; and (iii) not more than about 10 mole % containing less than 12 carbon atoms and not more than about 10 mole % containing more than 26 carbon atoms, said alkylation being conducted in a manner and under conditions sufficient to render the alkyl groups of said alkylated phenol essentially linear; and (2) condensing alkylated phenol consisting essentially of alkylated phenol provided in accordance with step (1) with a $C_1$ to $C_{30}$ aldehyde so as to produce a condensate of said alkylated phenol and said aldehyde having a number average molecular weight of at least about 3,000 and molecular weight distribution of at least about 1.5.

34. The method of claim 33 including sulfurizing said condensate.

35. The method of claim 33 wherein said condensing step is conducted in the further presence of at least one comonomer represented by the formula selected from the group consisting of:

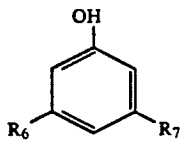

and:

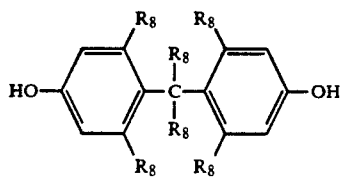

wherein $R_6$, $R_7$ and $R_8$ are each independently selected from the group consisting of hydrogen, alkyl, aryl, alkoxy, aryloxy, alkyl mercapto, and halogen, and wherein said comonomer is present in an amount of less than about 10 wt. % of said combination of said alkylated phenol and said aldehyde.

36. The method of claim 33 wherein said linear alpha-olefin comprises a mixture of linear alpha-olefins.

37. The method of claim 33 wherein said aldehyde comprises formaldehyde.

38. The method of claim 33 wherein said alkylation is conducted in the presence of an acidic crystalline aluminasilicate zeolite catalyst in order to minimize the production of dialkylate therein.

39. The method of claim 38 wherein said zeolite catalyst has a silica to alumina molar ratio of about 3:1 to about 6:1.

40. The method of claim 38 wherein said zeolite catalyst has a surface area of at least about 625 m²/g.

41. The method of claim 38 wherein said zeolite catalyst has a free pore diameter of between about 6 Å and about 8 Å.

42. The method of claim 38 wherein said alkylation is conducted using a molar ratio of said phenol to said linear alpha-olefin of less than about 2:1.

43. The method of claim 42 wherein said alkylation is conducted using a molar ratio of said phenol to said linear alpha-olefin of between about 1.7:1 and about 1:1.

44. Polymeric additive for improving the low temperature flow properties of hydrocarbon oils prepared by the process of reacting alkylated phenol represented by the formula:

wherein R represents essentially linear alkyl having from 6 to 50 carbon atoms in which the average number of such carbon atoms in all of said alkyl groups is between about 16 and 22, wherein not more than about 10 mole % of said alkyl groups have less than 16 carbon atoms and not more than about 10 mole % of said alkyl groups have more than 22 carbon atoms, with formaldehyde and optionally comonomer selected from the group consisting of trifunctional monomers represented by the formula:

and tetrafunctional monomers represented by the formula:

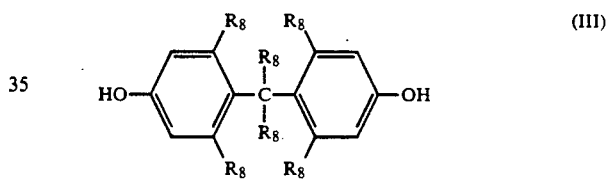

wherein $R_6$, $R_7$, and $R_8$ are selected from the group consisting of hydrogen, alkyl, aryl, alkoxy, aryloxy, alkyl mercapto, and halogen, to form polymer condensate having a number average molecular weight of at least about 5,000 and a molecular weight distribution of at least 1.5.

45. The additive of claim 44 wherein said essentially linear alkyl groups comprise at least 40 mole % alpha methyl substituted linear alkyl-groups.

46. The additive of claim 44 wherein R has an average number of carbon atoms between about 18 and 20.

47. The additive of claim 44 wherein $R_6$, $R_7$ and $R_8$ are hydrogen.

48. The additive of claim 44 wherein $R_8$ is selected from the group consisting of hydrogen and methyl.

* * * * *